(12) United States Patent
Pike et al.

(10) Patent No.: US 11,081,087 B2
(45) Date of Patent: Aug. 3, 2021

(54) MULTIPLE PRIMARY USER INTERFACES

(71) Applicant: Hand Held Products, Inc., Fort Mill, SC (US)

(72) Inventors: Jeffrey Pike, Murrysville, PA (US); Shawn Zabel, Fort Mill, SC (US); Dennis Doubleday, Pittsburgh, PA (US); Brian Bender, Jeanette, PA (US); Mark David Murawski, Pittsburgh, PA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 500 days.

(21) Appl. No.: 14/990,297

(22) Filed: Jan. 7, 2016

(65) Prior Publication Data

US 2016/0203797 A1    Jul. 14, 2016

Related U.S. Application Data

(60) Provisional application No. 62/101,156, filed on Jan. 8, 2015.

(51) Int. Cl.
*G09G 5/14*  (2006.01)
*G06F 3/16*  (2006.01)
(Continued)

(52) U.S. Cl.
CPC ............... *G09G 5/14* (2013.01); *G06F 3/00* (2013.01); *G06F 3/0481* (2013.01);
(Continued)

(58) Field of Classification Search
CPC ............... G06F 3/00; G06F 3/14; G06F 3/16
See application file for complete search history.

(56) References Cited

U.S. PATENT DOCUMENTS

| 6,832,725 B2 | 12/2004 | Gardiner et al. |
| 6,996,800 B2 | 2/2006 | Lucassen et al. |

(Continued)

FOREIGN PATENT DOCUMENTS

| WO | 2013163789 A1 | 11/2013 |
| WO | 2013173985 A1 | 11/2013 |

(Continued)

OTHER PUBLICATIONS

U.S. Appl. No. 14/715,916 for Evaluating Image Values filed May 19, 2015 (Ackley); 60 pages.

(Continued)

*Primary Examiner* — Cesar B Paula
*Assistant Examiner* — Sajeda Muhebbullah
(74) *Attorney, Agent, or Firm* — Alston & Bird LLP

(57) ABSTRACT

Generally discussed herein are techniques, software, apparatuses, and systems configured for presenting information to a user through multiple primary user interfaces. In one or more embodiments, a method can include providing first data to a first primary user interface that causes the first primary user interface to provide a first view of an application state of a software application, providing second data to a second primary user interface that causes the second primary user interface to provide a second view of the application state, changing the application state to a new application state, and in response to changing the application state, providing data to the first and second view modules so as to cause the first primary user interface to provide a first view of the new application state and the second primary user interface to provide a second view of the new application state.

18 Claims, 15 Drawing Sheets

(51) Int. Cl.

| | |
|---|---|
| *G06F 3/0488* | (2013.01) |
| *G06F 3/0489* | (2013.01) |
| *G06F 3/0484* | (2013.01) |
| *G06F 3/0481* | (2013.01) |
| *G09G 5/12* | (2006.01) |
| *G06K 7/01* | (2006.01) |
| *G06F 3/14* | (2006.01) |
| *G06F 9/54* | (2006.01) |
| *G06F 3/00* | (2006.01) |

(52) U.S. Cl.
CPC .......... *G06F 3/0484* (2013.01); *G06F 3/0489* (2013.01); *G06F 3/04883* (2013.01); *G06F 3/14* (2013.01); *G06F 3/16* (2013.01); *G06F 3/167* (2013.01); *G06F 9/542* (2013.01); *G06K 7/01* (2013.01); *G09G 5/12* (2013.01); *G06F 2203/04803* (2013.01)

(56) References Cited

U.S. PATENT DOCUMENTS

| | | |
|---|---|---|
| 7,128,266 B2 | 10/2006 | Marlton et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Suzhou et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |

(56) References Cited

U.S. PATENT DOCUMENTS

| | | | |
|---|---|---|---|
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey |
| 9,342,827 B2 | 5/2016 | Smith |
| 9,355,294 B2 | 5/2016 | Smith et al. |
| 9,367,722 B2 | 6/2016 | Xian et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,407,840 B2 | 8/2016 | Wang |
| 9,412,242 B2 | 8/2016 | Van Horn et al. |
| 9,418,252 B2 | 8/2016 | Nahill et al. |
| D766,244 S | 9/2016 | Zhou et al. |
| 9,443,222 B2 | 9/2016 | Singel et al. |
| 9,448,610 B2 | 9/2016 | Davis et al. |
| 9,478,113 B2 | 10/2016 | Xie et al. |
| 9,582,696 B2 | 2/2017 | Barber et al. |
| 9,616,749 B2 | 4/2017 | Chamberlin |
| 9,618,993 B2 | 4/2017 | Murawski et al. |
| 9,715,614 B2 | 7/2017 | Todeschini et al. |
| 9,734,493 B2 | 8/2017 | Gomez et al. |
| 10,019,334 B2 | 7/2018 | Caballero et al. |
| 10,021,043 B2 | 7/2018 | Sevier |
| 10,327,158 B2 | 6/2019 | Wang et al. |
| 10,410,029 B2 | 9/2019 | Powilleit |
| 2003/0046346 A1* | 3/2003 | Mumick .............. G06F 9/542 709/205 |
| 2004/0181467 A1* | 9/2004 | Raiyani ............. G06Q 10/087 705/28 |
| 2006/0149558 A1 | 7/2006 | Kahn et al. |
| 2007/0063048 A1 | 3/2007 | Havens et al. |
| 2007/0260972 A1* | 11/2007 | Anderl .............. G06F 3/038 |
| 2009/0134221 A1 | 5/2009 | Zhu et al. |
| 2009/0171659 A1* | 7/2009 | Pearce ............... H04L 67/02 704/235 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |

(56) References Cited

U.S. PATENT DOCUMENTS

| | | |
|---|---|---|
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | DiGregorio |
| 2014/0278391 A1 | 9/2014 | Braho et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |

(56) References Cited

U.S. PATENT DOCUMENTS

| | | |
|---|---|---|
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 14 pages.

U.S. Appl. No. 29/530,600 for Cyclone filed Jun. 18, 2015 (Vargo et al); 16 pages.

U.S. Appl. No. 14/707,123 for Application Independent Dex/Ucs Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Barndringa); 38 pages.

U.S. Appl. No. 14/740,373 for Calibrating a Volume Dimensioner filed Jun. 16, 2015 (Ackley et al.); 63 pages.

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

Matt Milner, "A Developer's Introduction to Windows workflow Foundation (WF) in .NET 4", 51 pages, Dated Nov. 2009 with updated to release date of Apr. 2010. [Examiner Cited in Related Matter Non Final Office Action dated Jun. 15, 2017; copy provided from https://msdn.microsoft.com/en-us/library/ee342461(d=printer).aspx].

Corcho et al., "A Platform for the Development of Semantic Web Portals", ICWe'06, Jul. 11-14, 2006 in Palo Alto, CA, US. Copyrighted 2006, 8 pages [Examiner Cited in Related Matter Non Final Office Action dated Jun. 15, 2017].

Alfons Brandi, "Chapter 15; Concepts for Generating Multi-User Interfaces Including Graphical Editors", published in Computer-Aided Design of User Interfaces III, Kluwer Academic Publishers, p. 167-178, Copyrighted 2002 [Examiner Cited in Related Matter Non Final Office Action dated Jun. 15, 2017].

Ahmed Seffah et al., "Multiple User Interfaces; Towards a Task-Driven and Patterns-Oriented Design Model", 2002 Springer-Verlag Berlin Heidelberg 2002, pp. 118-132.

U.S. Patent Application for a Laser Scanning Module Employing an Elastomeric U-Hinge Based Laser Scanning Assembly, filed Feb. 7, 2012 (Feng et al.), U.S. Appl. No. 13/367,978.

U.S. Patent Application for Indicia Reader filed Apr. 1, 2015 (Huck), U.S. Appl. No. 14/676,109.

\* cited by examiner

1000

| APPLICATION | |
|---|---|
| 1002A — STEP 1 | ✓ |
| 1002B — STEP 2 | ✓ |
| 1002C — STEP 3 | ✓ |
| 1002D — STEP 4 | |
| 1002E — STEP 5 | |
| 1002F — STEP 6 | |
| 1002G — STEP 7 | |
| 1002H — STEP 8 | ✓ |
| 1002I — STEP 9 | |
| 1002J — STEP 10 | |

*FIG. 10*

MULTIPLE PRIMARY USER INTERFACES

CROSS-REFERENCE TO RELATED APPLICATION

The present application claims the benefit of U.S. Provisional Patent Application No. 62/101,156 for MULTIPLE PRIMARY USE INTERFACES filed Jan. 8, 2015. The foregoing patent application is hereby incorporated by reference in its entirety.

FIELD

Embodiments of the present invention generally relate to the field of mobile device interface and, more specifically, to a user interface abstraction that can overcome one or more of the limitations of a standard one-to-one touchscreen user interface paradigm.

BACKGROUND

Modern mobile devices (e.g., portable data terminals (PDT), personal digital assistants (PDA), etc.) may be used by workers in performing their job duties. The primary mechanism for interacting with applications on these mobile devices is the touchscreen (e.g., display and virtual keyboard). The development paradigm for these devices tends to focus solely on the touchscreen as the primary means of input and output (i.e., the user interface (UI)) with some applications including voice dialog as a secondary means of interacting with an application. This paradigm of interfacing with an application via one primary interface (e.g., a touchscreen) can be restrictive.

Therefore, a need exists for improved mobile device interface systems and methods, including but not limited to a user interface abstraction that can overcome one or more of the limitations of a standard one-to-one user interface paradigm that focuses on the touchscreen.

SUMMARY

In one or more embodiments, an apparatus of the present disclosure can include a software application including a first view module, a second view module, and a view model module communicatively coupled to the first and second view modules. The apparatus can include a first primary user interface communicatively coupled to the first view module, the first primary user interface configured by the first view module to provide a first view of an application state of the application. The apparatus can include a second primary user interface communicatively coupled to the second view module, the second primary user interface configured by the second view module to provide a second view of the application state simultaneously with the first view of the application state. The view model module and the first and second view modules can be configured to exchange data and respond to commands issued in response to a user interacting with the first primary user interface and second primary user interface, the view model module configured to provide data and requests to the first and second view modules to cause the first and second view modules to render the first and second views of the application state.

In one or more embodiments, a method of the present disclosure can include providing, using a first view module, first data to a first primary user interface that causes the first primary user interface to provide a first view of an application state of a software application, providing, using a second view module, second data to a second primary user interface that causes the second primary user interface to provide a second view of the application state simultaneously with the first view, changing the application state to a new application state; and/or, in response to changing the application state, providing data to the first and second view modules so as to cause the first primary user interface to provide a first view of the new application state and the second primary user interface to simultaneously provide a second view of the new application state.

In one or more embodiments, a non-transitory computer readable medium (e.g., storage device) of the present disclosure can include instructions stored thereon that, when executed by a machine, the machine is configured to perform operations including providing first data to a first primary user interface that causes the first primary user interface to provide a first view of an application state of a software application, providing second data to a second primary user interface that causes the second primary user interface to provide a second view of an application state of a software application simultaneously with the first view, changing the application state to a new application state and, in response to changing the application state, providing data to the first and second primary user interfaces so as to cause the first primary user interface to provide a first view of the new application state and the second primary user interface to simultaneously provide a second view of the new application state.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present disclosure.

FIG. 10 illustrates, by way of example, an embodiment of a visual view of an application that includes directing the user to perform a plurality of tasks.

DETAILED DESCRIPTION

Figure 1:
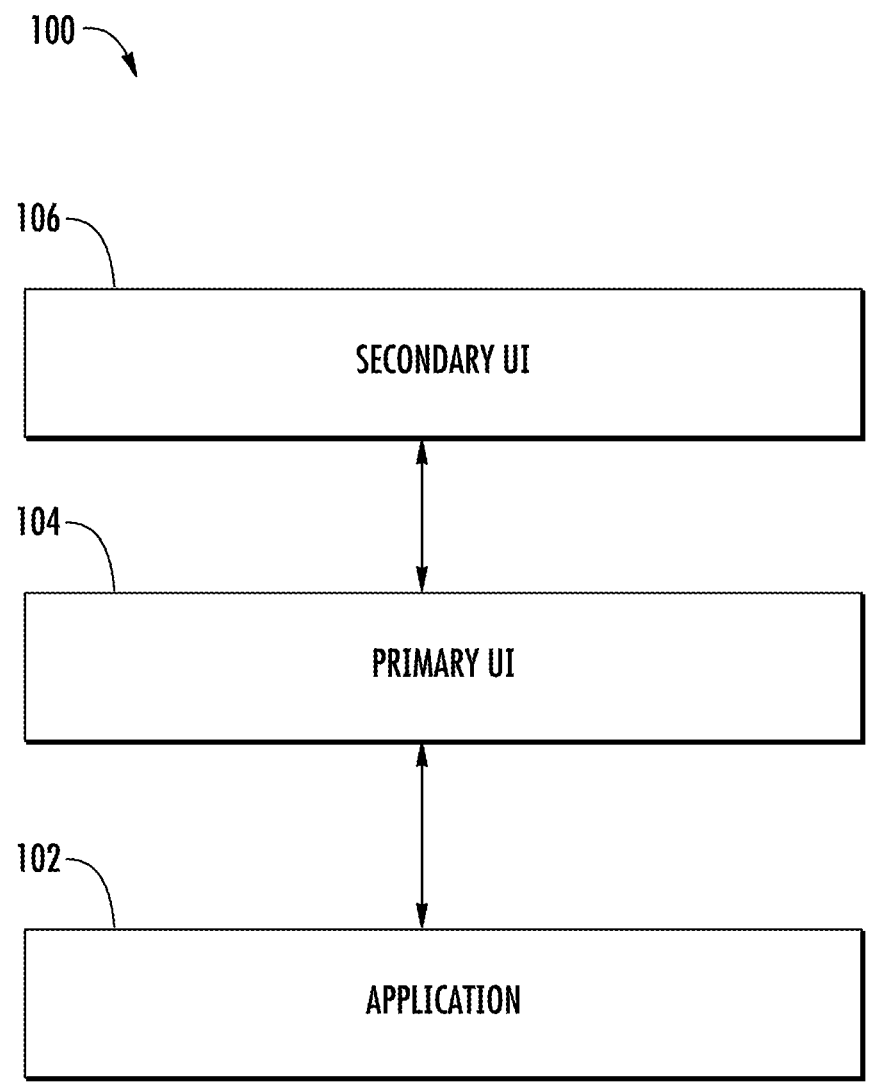
FIG. 1 illustrates a block diagram of a conventional application display system.

While embodiments of this disclosure can take many different forms, specific embodiments are shown in the Figures and will be described herein in detail with the understanding that the present disclosure is to be considered as embodiments of the principles of the disclosure, as well as the best mode of practicing the same, and is not intended to limit the disclosure to the specific embodiments illustrated.

Software applications for a mobile device can have a one-to-one relationship between an application state and an interactive view presented to the user, such as through a user interface (UI) (i.e., the junction between a user and an application). This one-to-one relationship can limit the ability of an application developer in adding another mode of interaction and can make it more difficult (or even prohibitive) to add another primary mode of user interaction. This paradigm of interfacing with an application via one primary interface can be restrictive.

Using this one-to-one paradigm, adding other modes of user interaction such as voice, scanning, or motion can typically only be achieved through supplementing the primary mode (e.g., the touchscreen) with a secondary mode. As a consequence, the developer is limited to the design layout of the primary mode. If the primary mode is unavailable, the additional modes of interaction don't make sense or are also unavailable. Creating an effective supplementary voice dialogue view can be difficult under these limitations. For examples, difficulties may be encountered when trying to allow more than one mode to be in control of the application's state at the same time, such as a visual view and a voice dialogue view.

Discussed herein are embodiments that can include a UI abstraction that can overcome one or more of the limitations of the one-to-one paradigm. The UI abstraction can be used to decouple an application state from a mode of interaction. Such an abstraction can provide flexibility and versatility to an application developer. By creating a UI abstraction, such as for input and output, multiple UI objects can be active and able to control the application's state at the same time. For example, a GUI (graphical user interface) and VUI (voice user interface) can coexist to interface with the application.

One UI view can be associated with one or more application states, and that view can be different than other views for that same application state. In this way, an application developer can define multiple, separate independent views for each application state and/or multiple primary independent user interfaces can be enabled. The dependency of the application to a primary mode of operation can be eliminated and the interaction mode of the application can be decoupled from the application.

Multiple primary UIs can be accomplished by associating multiple views with an application state, giving an N:1 view to application state ratio, where N is the number of primary UI views. Each specific view for a state can be active simultaneously. Each view can access the application, retrieving or sending information to or from the application. The information received from one view can be reflected in all currently active views. In an embodiment that includes both voice dialogue and visual views, there can be two views that have simultaneous access to the application (e.g., to have the ability to cause the application state to change).

What follows includes a discussion of a prior application display system followed by a discussion of a display system in accord with one or more embodiments. A discussion of how one or more navigation stacks can be managed and a discussion of some application development techniques are also presented.

FIG. 1 illustrates a block diagram of a conventional application display system 100. The system 100 as illustrated includes an application 102, a primary UI 104, and a secondary UI 106.

As used herein a "primary UI" is a UI though which a user can directly alter the state of an application independent of any other UI. A "secondary UI" is a UI through which a user can input data into a specific field of the primary UI. The secondary UI does not alter the state of an application directly, but is dependent on another UI (i.e., the primary UI) to update the state of an application. Using multiple primary UIs, a user can directly alter the application state using any one of the primary UIs. Using multiple primary UIs, a user can deactivate (e.g., disable or power off) one of the other primary UIs and can continue to alter the state of the application directly using the remaining active primary UIs. In the case of a secondary UI coupled with a primary UI, if the primary UI is deactivated or disabled, a user will not be able to alter the state of the application using the secondary UI or the primary UI.

The primary UI 104 is required for a user to alter an application state of the application 102. The user can interact with the application 102 using the secondary UI 106, but only via the primary UI 104. For example, consider a mobile device that includes a touchscreen as a primary UI and a voice dialogue as a secondary UI. A user can speak a command into the voice dialogue, such as "get directions home." The voice dialogue can then be translated into commands that are issued by the primary UI 104 to the application 102. If the primary UI 104 is deactivated or disabled, the secondary UI 106 will not be able to access the application 102, thus making it impossible for the user to interact with the application 102 using only the voice dialogue (i.e., the secondary UI 106 in this example).

Multiple Primary UIS

Figure 2:
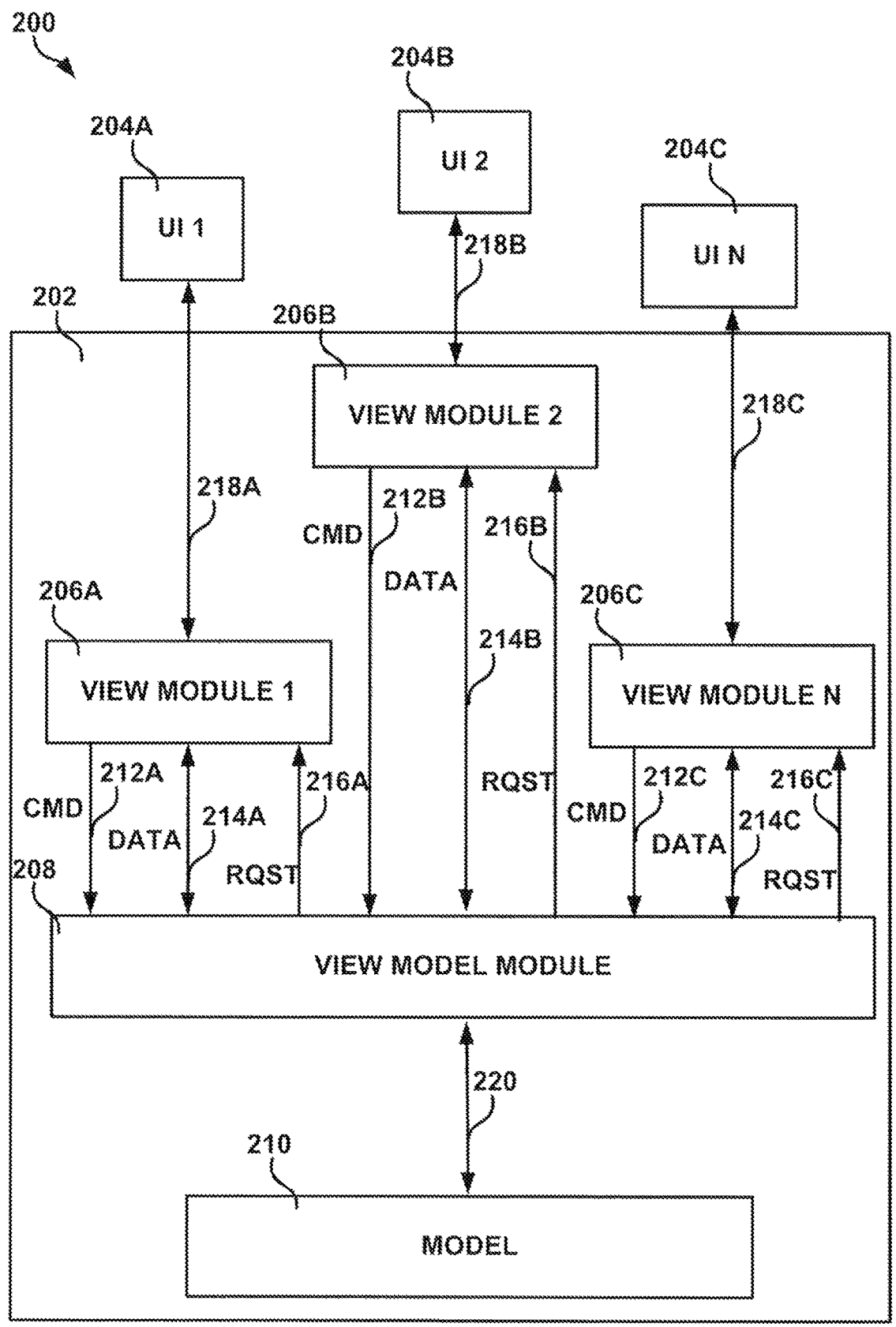
FIG. 2 illustrates, by way of example, a block diagram of an embodiment of a multi-view system.

FIG. 2 illustrates, by way of example, a block diagram of an embodiment of a multi-view system 200. The multi-view system 200 as illustrated includes an application 202 and a plurality of primary UIs 204A, 204B, and 204C. The application 202 as illustrated includes a plurality of view modules 206A, 206B, and 206C communicatively coupled to the respective primary UIs 204A-C. The view modules 206A-C are each communicatively coupled to a view model module 208 through the connections 212A, 214A, and 216A, 212B, 214B, and 216B, and 212C, 214C, and 216C, respectively. The view model module 208 is communicatively coupled to a model 210 (e.g., application logic) through the connection 220. The view modules 206A-C may be referred to in the industry as "views" and the view model module 208 may be referred to in the industry as a "view model." The model 210 may be implemented as a module.

The application 202 can be any software application that can benefit from or use multiple primary UIs 204A-C. The application 202 can provide a workflow of instructions to a worker, for example. For instance, the application 202 can provide a workflow for diagnosing or fixing an issue with a vehicle or other equipment, picking merchandise from a shelf (e.g., in a warehouse, retail store, etc.), a video game in which a user can issue commands in multiple ways (e.g., using two or more of voice, a keyboard, a joystick, etc.), a data entry application, or a text editing application, among others. The application 202 can be embodied in the form of instructions stored on a storage device, such as a read only memory (ROM), a random access memory (RAM), or a combination thereof, and executable by a processor of a machine.

The view modules 206A-C can provide data, such as through the connection 218A, 218B, and 218C, respectively, to the primary UIs 204A-C that cause the UIs 204A-C to render a view of an application state of the application 202. The view of the application 202 provided by the UI 204A-C can include, for example, a voice dialogue view, a visual view, or a combination thereof. The voice dialogue view can be presented to a user through a UI 204A-C that includes a speaker and microphone. The user can provide data, instruction, or confirmation to the UI 204A-C through the microphone and the UI 204A-C can provide the user data, instruction, or confirmation through the speaker. The visual view can include a UI 204A-C that includes a display and keyboard (e.g., a touchscreen and a virtual or hardware keyboard or a non-tactile screen coupled to a hardware keyboard), a printer that can display or print (on paper) one or more instructions, images, and/or other text and/or receive user input through a keyboard (e.g., keypad or touchscreen) coupled thereto, a monitor or other display (e.g., a remote monitor, a secondary monitor, a projector and projector screen, or the like), and/or a barcode scanner (e.g., a one-dimensional or multi-dimensional barcode scanner, such as a Universal Product Code (UPC) or Quick Response (QR) code scanner) that includes a display (e.g., a touch screen or non-tactile display) and/or a keyboard (e.g., a keypad, a virtual keyboard, or a hardware keyboard) coupled thereto.

The view module 206A-C is not required to provide both input and output. For example, a screen does not need to be paired with a keyboard, scanner, and/or touchpad for example. The view module 206A-C can provide output only, such as a screen, printer, speaker, Light Emitting Diode (LED), or the like. A separate view module can take input for the application, such as a touch screen, scanner, voice, pressure sensor, accelerator, temperature sensor, proximity sensor, or the like. The view module 206A-C may provide input, output, or both input and output for the application 202. The application 202 may have any number of view modules, none of which are in communication with any of the other view modules.

The view modules 206A-C can receive information from the primary UIs 204A-C and translate the information from the UIs 204A-C into a command and/or data to be sent to the view model module 208, such as by using the connections 212A-C, 214A-C, and/or 216A-C. For example, if a user enters data into a field using the UI 204A-C, the data received can be converted into a format compatible with the view model module 208. The view module 206A-C can indicate to the view model module 208 the field in which the data was added. The view model module 208 determines, using the model 210, an action (if any) to take in receiving information from the UI 204A-C through the view module 206A-C. The model 210 includes logic to determine a state of the application 202 (see FIG. 3 for a simplified flow diagram of application state logic, in accord with one or more embodiments).

The view model module 208 determines instructions (e.g., a request and/or data) to be provided to the view module 206A-C so that the UI 204A-C communicatively coupled to the respective view module 206A-C provides a view of the application state consistent with the current state of the application 202, as determined by the application model 210.

Figure 3:
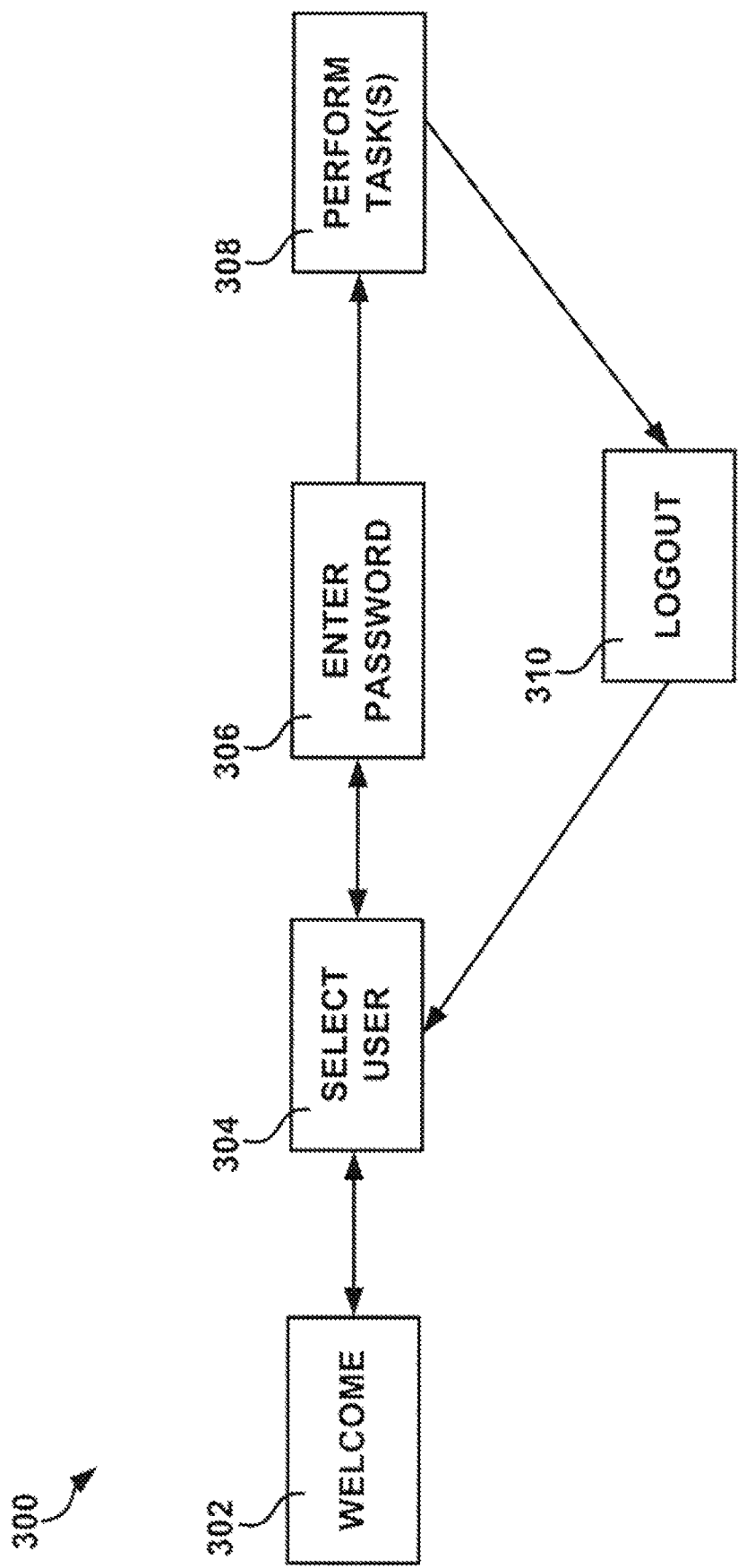
FIG. 3 illustrates, by way of example, a flow diagram of application states of a generic application.
Figure 4:
FIG. 4 illustrates, by way of example, an embodiment of a use case including a user using multiple primary UIs.

FIG. 3 illustrates, by way of example, a flow diagram of application states 300 of a generic application, such as the application 202. FIG. 4 illustrates, by way of example, an embodiment of a use case including a user 400 with the UIs 204A-C. When the application 202 is launched and/or initialized, a welcome state 302 can be entered. The welcome state 302 can include respective views from each of the primary UIs 204A-C that are rendered by the view modules 206A-C. In the example of FIG. 4, the UI 204A includes a barcode scanner and a display the UI 204B includes a microphone and a speaker, and the UI 204C includes a touch screen and virtual keyboard. The UIs 204A and 204C can display to a user some visual indication that the application has launched, such as text or other graphic. The UI 204B can indicate to the user, through a speaker, that the application has launched, such as by announcing "welcome" or the like. The visual UIs 204A and 204C can indicate that the user confirmation is required to move onto the next application state 304 or the next application state 304, (i.e., select user) can be entered through a specified period of time elapsing since the application state 302.

The voice dialogue UI 204B can indicate to the user through sounds emanated through the speaker that a confirmation is required. After the user confirms using any one of the UIs 204A-C (or the specified period of time has elapsed), the model 210 can indicate that the application 202 is now in application state 304 ("select user"). The model view module 208 can provide data and/or a request to the view modules 206A-C that indicates a configuration of the view to be rendered by the UIs 204A-C. The UIs 204A-C can then provide respective views of the application state 304 "select user". In the application state 304 the user can be prompted to provide identification, such as by providing a username or other identification. The identification can be provided verbally to a speaker of the UI 204B or through a user entering the information using a keyboard, selecting a user from a list of users presented using the UI 204A or 204C, or scanning a code using the barcode scanner.

In response to a valid username being entered, the next application state 306 (i.e., "enter password") can be entered, such as by the view module 206A-C providing data indicating the username to the view model module 208 which can then update the model 210. The model 210 can then indicate to the view model module 208 what the next application state is, which in the example of FIG. 3 is the "enter password" application state 306. The view model module 208 can provide data and/or requests to the view module(s) 206A-C to cause them to render respective views of the application state on the UIs 204A-C. This process can continue so that the remaining application states—perform tasks 308 and logout 310—can be viewed and interacted with by a user.

If one of the UIs 204A-C is deactivated (e.g., disabled or powered off) the remaining active UIs can be interacted with to alter the application state. Using the system 200, the application 202 can operate independent of the number or type of primary UIs 204A-C coupled to the application 202. Any UI can be coupled to the application 202 as long as a corresponding view module is coupled to the view mode module 208 to drive the UI. Such a configuration allows for a variety of new and different UIs to be coupled to the application to provide views of the application state.

An application developer can configure a workflow activity manager module to enable or disable a view for each application state and define the view module(s) and view model module(s) associated with the application stat. A workflow activity is used to configure which view model module and view(s) is associated with a given application state. The view model module is independent of the view modules that are coupled thereto. The workflow activity manager can provide data to cause the view module 206A-C to enable/disable the associated view provided by the primary UI 204A-C coupled to the respective view module 206A-C. Thus, one or more views of the application state may persist across application state changes while one or more views may be disabled in response to an application state change. For example, a voice dialogue view can persist through an application state change, while a visual view may be disabled in response to the application state changing, or vice versa. If a view is disabled, the user can no longer alter the application state through interacting with the primary UI 204A-C associated with that disabled view.

The view provided by a primary UI 204A-C may persist (i.e., may not change) across an application state change while a view provided by another primary UI 204A-C may change across the same application state change. For example, using an application that includes filling out a form that includes multiple fields to be filled in by the user, the visual view of the form can persist across an application state change while the dialogue view of the application state changes across the same application state change or vice versa.

Figure 5:
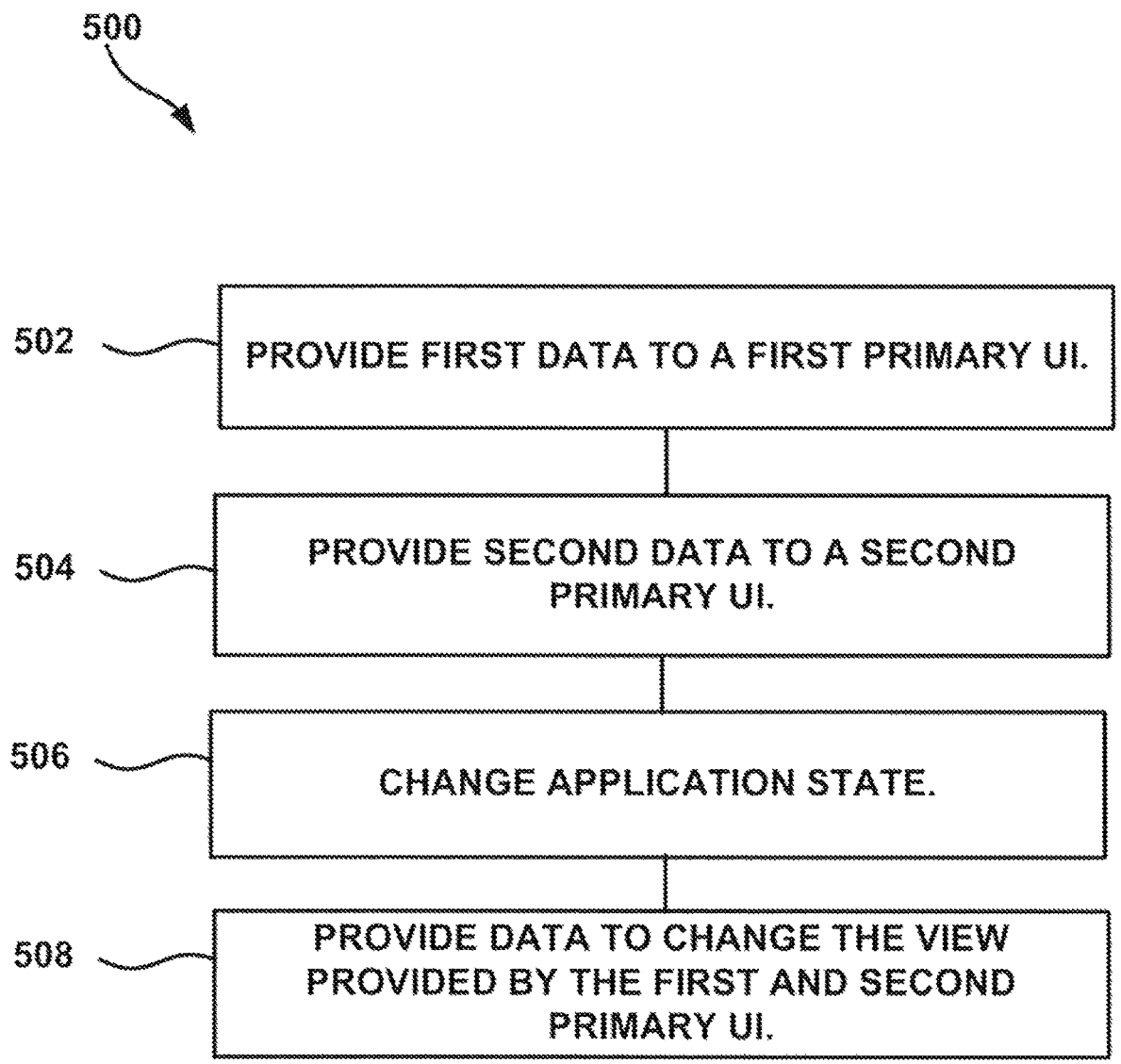
FIG. 5 illustrates, by way of example, a flow diagram of an embodiment of a method of using a multi-view system.

FIG. 5 illustrates, by way of example, a flow diagram of an embodiment of a method 500 of using a multi-view system, such as the system 200. The method 500 as illustrated includes: providing first data to a first primary UI at operation 502; providing second data to a second primary UI at operation 504; changing an application state at operation 506; and providing data to change the view provided by the first and second primary UIs at operation 508. The operation at 502 can be accomplished using the view module 206A-C. The view module 206A-C can provide data to the first primary UI 204A-C that causes the first primary UI to provide a first view of an application state of a software application. The operation at 504 can be accomplished using a second view module 206A-C. The second view module 206A-C can send data to the second primary UI 204A-C that causes the second primary UI 204A-C to provide a second view of the application simultaneously with the first view.

The operation at 508 can be performed in response to the operation at 506 being performed. The operation at 506 can be performed by the model 210 using application logic to update the application state and providing the updated application state to the view model module 208. The operation at 508 can be accomplished by providing data, from the first and second view modules 206A-C and to the first and second primary UIs 204A-C that causes the first and second primary UIs to provide views of the updated application state. The view provided by the second primary UI 204A-C (i.e., the second view) can be provided simultaneously with the view provided by the first primary UI 204A-C (i.e., the first view).

The method 500 can include providing, such as by using a third view module 206A-C, third data to a third primary UI 204A-C that causes the third primary UI 204A-C to provide a third view of an application state of a software application simultaneously with the first and second views. The method 500 can include providing, in response to changing the application state, data to the third primary UI 204A-C (i.e., from the third view module 206A-C) to cause the third primary UI to provide a third view of the new application state simultaneously with the first and second views.

The views (i.e., the views provided by the first, second, and/or third primary UIs 204A-C) can include a visual view and/or a voice dialogue view. A visual view can be provided by a UI that includes a display. An input mechanism, such as a keyboard, scanner, or touch screen, can be used to receive information from a user interacting with the UI that provides a visual view. A voice dialogue view can be provided by a UI that includes a speaker. An input mechanism, such as a microphone and a voice recognition module, can be used to receive information from a user interacting with the UI that provides the voice dialogue view.

The method 500 can include receiving at the view model module 208; data entered using the first primary UI 204A-C. The method 500 can include providing data to the first and/or second primary UIs 204A-C (i.e., using the first and/or second view modules, respectively) so that the data received from the first primary UI 204A-C is presented in the second view (e.g., simultaneous with the data being presented in the first primary UI 204A-C). The method 500 can include deactivating the first primary UI 204A-C, such as by a user actively deactivating (e.g., powering off) the primary UI 204A-C or the application changing application state and the view model module 208 deactivating the view module 206A-C communicatively coupled to the primary UI 204A-C. The method 500 can include, in response to receiving data indicative of second data and a second command from a user interacting with the second primary UI 204A-C, changing the application state.

Stack Handling

Using a system with multiple primary UIs, the navigation stack of the UIs may operate differently than in a system that includes the one-to-one relationship between the application state and the UI view. Consider a multiple primary UI system where one of the primary UIs is a voice dialogue view and a "back" button is pressed. Using a navigation stack that saves only previous screen views, the navigation stack will cause a UI to provide a previous screen view, but not a repeat of a previous voice dialogue view. A different navigation stack handling technique can be used to help overcome this issue. A different stack handling technique can help the multiple primary UIs remain in synch.

Figure 6:
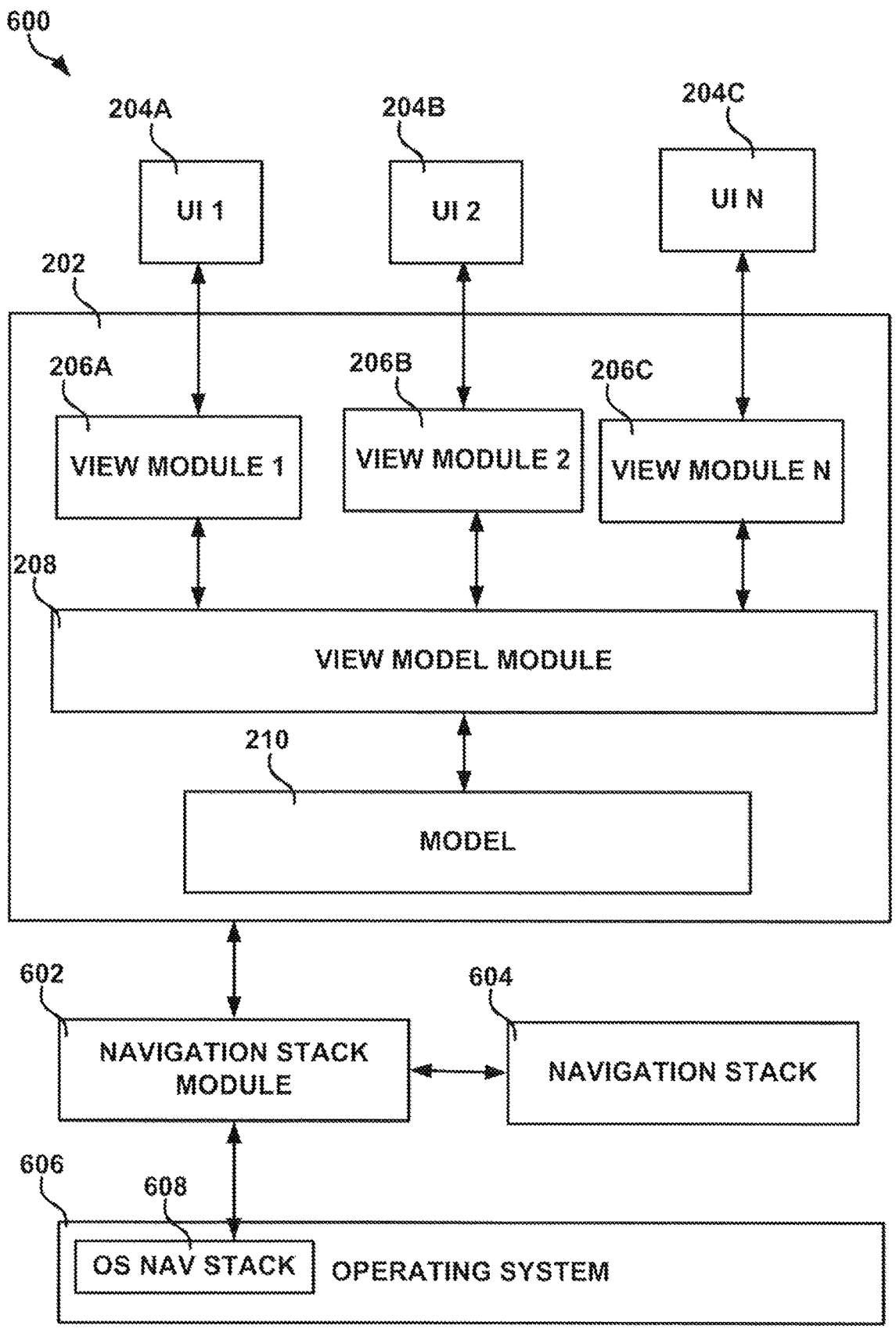
FIG. 6 illustrates, by way of example, a block diagram of an embodiment of a multi-view system.

FIG. 6 illustrates, by way of example, a block diagram of an embodiment of a system 600, including multiple primary UIs 204A-C. The system 600 can be similar to the system 200 with the system 600 including a navigation stack module 602, a navigation stack 604, and an operating system (OS) 606 including an OS navigation stack 608. The navigation stack module 602 can manage the entries in the navigation stack 604 and the OS navigation stack 608. The navigation stack module 602 can push and pop entries onto and off of the navigation stack 608 and the OS navigation stack 608.

The navigation stack 604 can be configured to store a workflow activity as an entry thereon. A "workflow activity" as used herein includes data corresponding to a configuration of the view model module 208 and a list of views associated with the configuration. The data causes the view model module 208 to perform one or more operations that causes the plurality of views to be presented on the multiple primary UIs 204A-C in response to the data being loaded in the view model module 208. The data, in response to being loaded in the view model module 208, causes the view model module to provide data and/or a request to the view module(s) 206A-C to cause the view modules 206A-C to render a view on the primary UI 204A-C.

Figure 7:
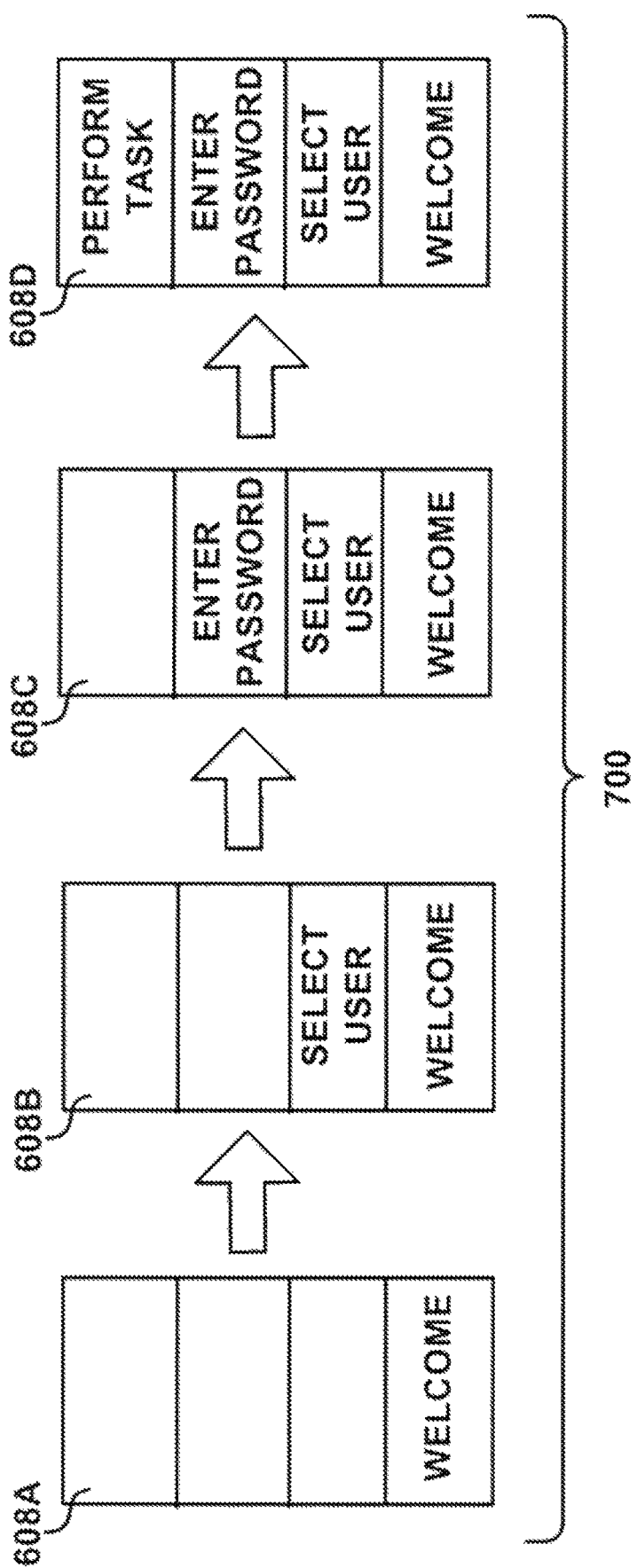
FIG. 7 illustrates a flow diagram of operating system stacks using the system to execute an application

The OS navigation stack 608, which may not be present in all OSs, stores screen views displayed on a screen of an apparatus, such as a mobile device. FIG. 7 illustrates a flow diagram of operating system stacks 700 using the system 100 to execute an application, such as an application that includes the application states as shown in FIG. 3. In a system that includes a one-to-one relationship between an application and a primary UI, such as the system 100, the navigation stack can be designed to only handle the previously presented screens using the UI. For example, as shown in FIG. 7, the OS navigation stack 608A reflects the state of the OS navigation stack 608 after the application 102 has been initialized and the welcome application state 302 has been entered. After the select user application state 304 is entered, the select user screen view can be pushed onto the stack, such as shown in the OS navigation stack 608B. If a user were to press the back button at this point, the stack would be in the state as shown in the OS navigation stack 608A by popping the select user entry off the stack 608B. The UI 104 would then show the view associated with the welcome application state 302 of the application 102.

The OS navigation stack 608C reflects the state of the OS navigation stack 608 after an enter password entry has been pushed on the stack 608B. The OS navigation stack 608D reflects the state of the OS navigation stack 608 after a perform task entry has been pushed on the stack 608C. In general, if a user navigates to the previous screen, the last entry in the stack is popped off and the entry prior the operation that was popped is reflected using the UI 104.

As was previously discussed, if a voice dialogue view, or other view, is added as another primary UI, the OS navigation stack is not able to reactivate the previous voice or other view. Without a new approach to this stack methodology, it can be difficult if not impossible to keep the primary UIs in synch as the application state is changed, such as by a user navigating to a previous view or interacting with the application to change the application state. The system 600 can approach the stack by capturing an application state change in a framework layer between the OS layer and the application layer and managing the OS navigation stack 608 and the navigation stack 604 from the framework layer.

The navigation stack module 602 manages the workflow activities stored on the navigation stack 604 and also overrides the OS navigation stack 608 to maintain consistency between the views provided the OS navigation stack 608 and the views of the UI 204A-C. The navigation stack module 602 can reside in the framework layer and manage the stacks.

In using multiple primary UIs 204A-C the navigation stack module 602 can maintain the stack (i.e., the navigation stack 604 and/or the OS navigation stack 608) such that each view provided by the primary UIs 204A-C are consistent with each other and the application state. Consider a first primary UI that provides a visual view and a second primary UI that provides a voice dialogue view. If a user navigates backwards in the visual view, the voice dialogue view should also present its previous view, such as dialogue previously presented using the second primary UI.

Figure 8:
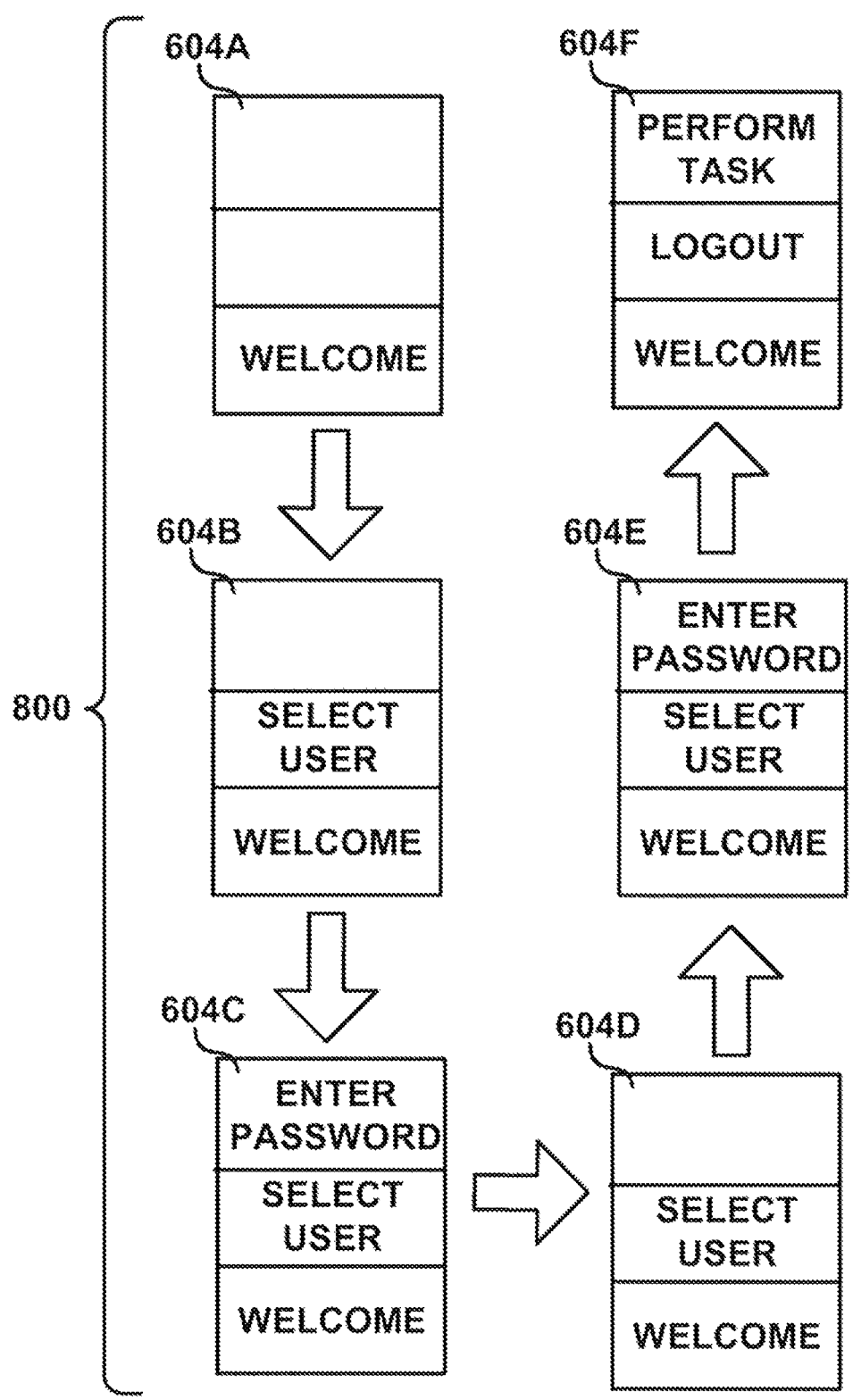
FIG. 8 illustrates, by way of example, a flow diagram of an embodiment of navigation stack states.
Figure 9:
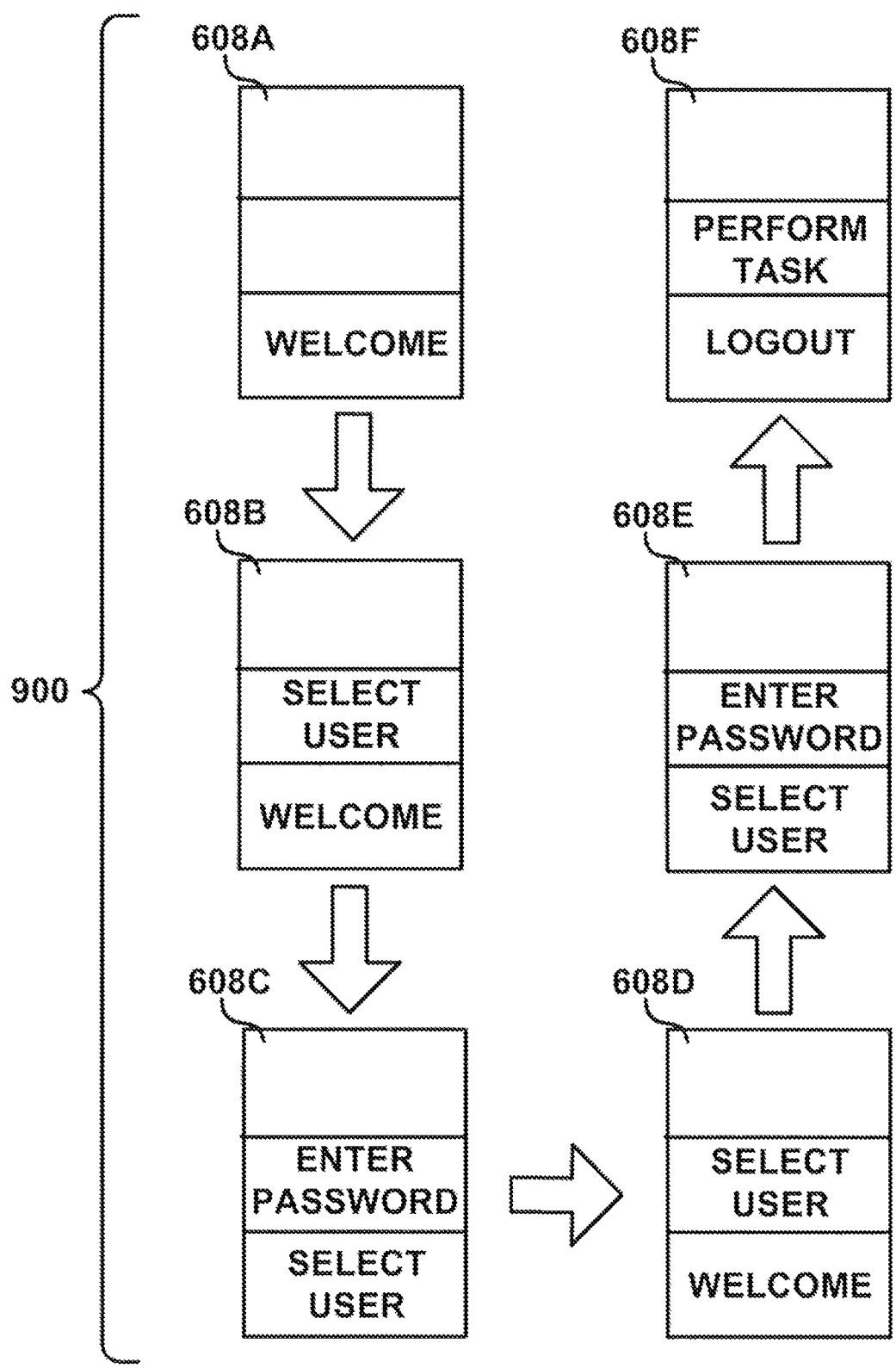
FIG. 9 illustrates, by way of example, a flow diagram of an embodiment of OS navigation stack states.

FIGS. 8 and 9 illustrate, by way of example, flow diagrams of embodiments of navigation stack states 800 and corresponding OS navigation stack states 900 using the navigation stack module 602. FIGS. 8 and 9 show entries on the navigation stack 604 and the OS navigation stack 608 using an application that includes application states as shown in FIG. 3. The navigation stack module 602 manages the OS navigation stack 608A to be consistent with the navigation stack 604A, the OS navigation stack 608B to be consistent with the navigation stack 608B, and so on.

The navigation stack 604A and the OS navigation stack 608A show the stacks after the application 202 has entered the "welcome" application state 302. In response to the application state changing to the "select user" application state, a select user entry can be pushed onto the respective stacks 604A and 608A, such as shown in navigation stack 604B and OS navigation stack 608B. The navigation stack 604C and the OS navigation stack 608C show the stacks after the application 202 has entered the "enter password" state 306.

The OS navigation stack 608C includes only two entries at this point, namely "enter password" and "select user". The navigation stack module 602 can manage the entries on the OS navigation stack 608, such that at most two entries are on the OS navigation stack 608 for an appreciable amount of time. By keeping two or more entries on the stack, an animation or other transition between visual views of an application state can be displayed, such as to keep the user experience as a user might expect. The navigation stack module 602 can pop an entry off the OS navigation stack 608 and/or push an entry on the stack to manage the entries of the OS navigation stack 608. Note that not all OS 606 use OS navigation stacks. For example, iOS devices do not use a navigation stack. In such an instance, the navigation stack module 602 may only manage the navigation stack 604.

The navigation stack 604D and the OS navigation stack 608D show the stacks after the application 202 has returned to the "select user" application state 302. The OS navigation stack 608 can be managed, such that the current application state and another application state are stored as entries thereon at a given time. The OS navigation stack 608 can include an entry that corresponds to an application state that will be loaded in response to a user navigating to a previous application state using one or more of the primary UIs 204A-C.

In response to the application state changing back to the "enter password" application state 306, an enter password entry can be pushed onto the respective stacks 604D and 608D, such as shown in navigation stack 604E and OS navigation stack 608E. The navigation stack 604F and the OS navigation stack 608F show the stacks after the application 202 has entered the "perform task" state 308. The navigation stack module 602 can push an entry onto the respective stacks that corresponds to an application state that has not yet been entered by the application 202 (at least in the current session of the application). The unperformed application state entry that was pushed on the respective stack in the example of FIGS. 8 and 9 are "logout" entries. If a user were to navigate to a previous screen while the application 202 is in the "perform task" application state 308, the logout entry would be loaded into the view model module 208 and the OS 606 to provide the "logout" application state 310 view using the UIs 204A-C.

In one or more embodiments, a visual view can provide an event-driven interface, while a dialogue view can be used for directed application navigation. For example, a visual view can list a series of questions to be answered by the user, while a voice dialogue view can provide the user with one question at a time. If the next question in the list is answered by the user using either of the voice dialogue view or the visual view, then the next question can be presented to the user using the voice dialogue view. In such a case, the voice dialogue view and the visual view can become out of sync.

However, some rules may be defined to handle a case in which the user answers a question out of order using the visual view.

One or more synchronization techniques between the voice dialogue view and the visual view can help overcome the synchronization issue. Since a voice dialogue view generally focuses on one item at a time, the visual view can include a highlight of the current voice dialogue view application state being presented, such as to alert a user which application state the voice dialogue view is presenting. If the highlighted item is disposed of by the user using the voice dialogue view or the visual view, the next item in the list can be highlighted in the visual view and presented to the user in the voice dialogue view. This provides an example of a visual view persisting in response to an application state change while a voice dialogue changes across the same application state change.

If the user disposes of a different item other than the highlighted item, then the view model module 208 can be configured to perform a variety of operations including one or more of: (1) disabling the voice dialogue view (e.g., temporarily disabling); (2) causing a sound to be provided to the user using the voice dialogue view, such as to indicate to the user that the previous item was disposed of out of order; (3) causing the voice dialogue view to present the highlighted application state to the user; and (4) causing the voice dialogue view to present the application state after the application state that was disposed of out of order in the list (or presenting a next application state not disposed of in the list after the application that was disposed which can include wrapping to the beginning of the list when the end of the list is reached). In one or more embodiments, the user can indicate via a voice keyword to re-synchronize with the other modes and/or which application state to synchronize at. An application developer can use a library application programming interface (API), for example, to specify how the application 202 and the navigation stack module 602 are to handle synchronization.

FIG. 10 illustrates, by way of example, an embodiment of a visual view 1000 of an application that includes a plurality of steps 1002A, 1002B, 1002C, 1002D, 1002E, 1002F, 1002G, 1002H, 1002I, and 1002J. Consider an application that includes a visual view that indicates to a user to perform the tasks (e.g., steps), such as the steps 1002A-J as shown in FIG. 10. In the example of FIG. 10, the user has completed steps 1002A-C and step 1002D is highlighted to be completed next. However, instead of completing step 1002D, the user has skipped to the step 1002H and completed that step out of order. The model 210 can be configured in a variety ways to handle such a situation. The model 210 can be configured to resume from an application state corresponding to the step 1002I, to the highlighted step 1002D, or can be configured to pause and not update the voice views until the user finishes all the steps, provides a voice command or otherwise resumes the application (e.g., by activating a button on a visual view), or a specified period of time has passed.

A sound indicating that the user has performed a task out of order can be presented to the user, such as through a voice dialogue view. If the user were to complete the step 1002J out of order, the model 210 can be configured to update the application state to resume at the step 1002D (e.g., wrapping around to the next uncompleted step). A user can provide a keyword command, such as "skip," that causes data to be sent to the model to update the application state to cause the view model to load the view associated with presenting the next step in the application.

In one or more embodiments, the navigation stack module 602 can manage the navigation stack 604 and/or the OS navigation stack 608 such that at any point in the application state "performing tasks," such as those described with regard to FIG. 10, the logout screen can be presented in response to a user navigating backwards using any of the multiple primary UIs 204A-C. In one or more other embodiments, the navigation stack module 602 can manage the navigation stack 604 and/or the OS navigation stack 608 such that at any point in the application state of performing tasks, the task most recently completed can be reflected as not completed in the primary UI(s) 204A-C and re-presented to the user. In such embodiments, if no tasks have been completed, the navigation stack 604 and the OS navigation stack 608 can be managed such that a logout application state is loaded into the view model module 208 and then the welcome application state is loaded into the view model module 208.

Figure 11:
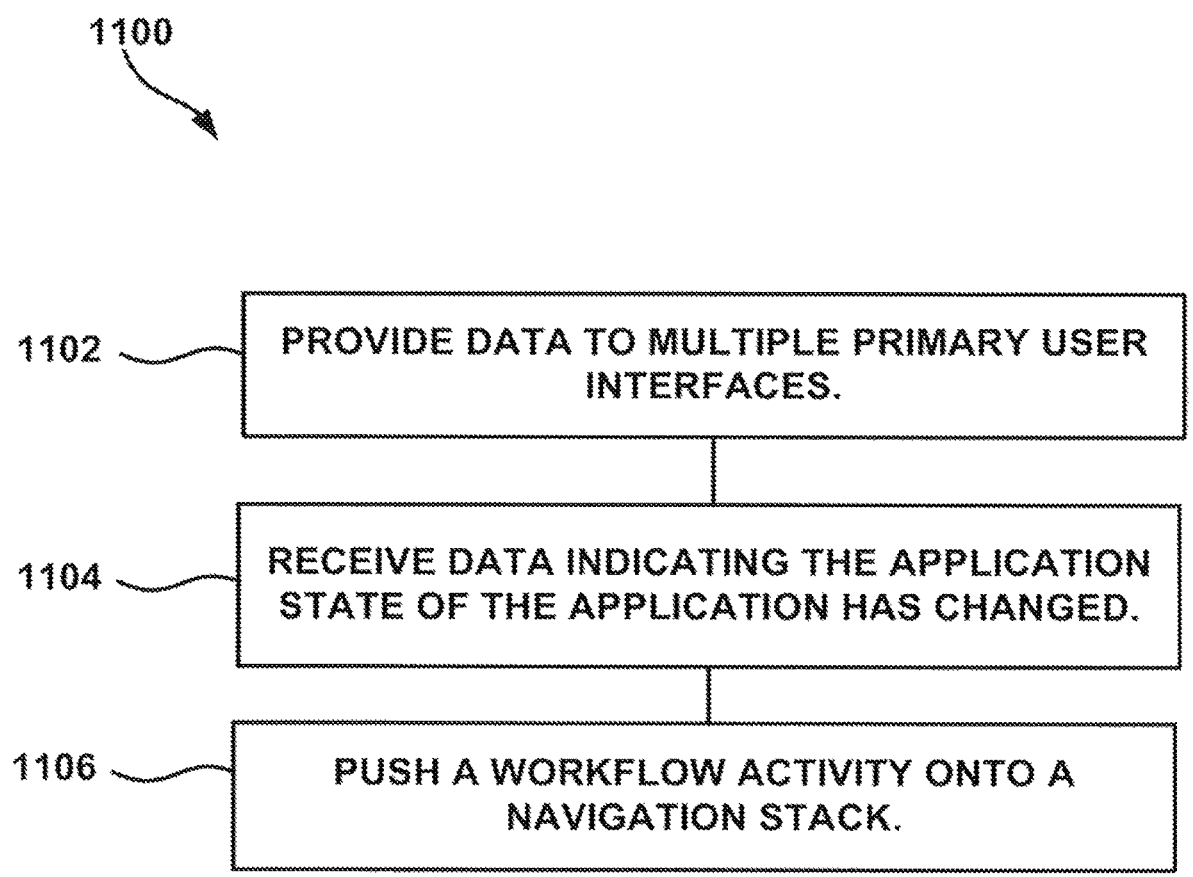
FIG. 11 illustrates, by way of example, a flow diagram of an embodiment of a method of handling one or more stacks.

FIG. 11 illustrates, by way of example, a flow diagram of an embodiment of a method 1100 of handling one or more stacks. The method 1100 as illustrated includes: provide data to multiple primary UIs (e.g., the UIs 204A-C), at operation 1102; receiving data indicating the application state of the application has changed, at operation 1104; and pushing a workflow activity onto a navigation stack, at operation 1106. The data provided at operation 1102 can be provided using a view model module of a software application. The data provided at operation 1102 can cause each of the multiple primary UIs to present a view of an application state of the software application. The data received at operation 1104 can be received at the view model module 208 (e.g., from the model 210). The operation at 1106 can be performed in response to performing the operation at 1104. The operation at 1106 can be accomplished using a navigation stack module 602 communicatively coupled to the software application 202. Each workflow activity can include data corresponding to a configuration of the view model module 208 and a list of views associated with the configuration. The data of the workflow activity can cause the view model module 208 to provide the data that causes the plurality of views to be presented on the multiple primary UIs in response to the configuration being loaded on in the view model module 208.

The method 1100 can include storing visual views to be presented using a display of the apparatus on an OS navigation stack 608 communicatively coupled to the navigation stack module 602. The method 1100 can include managing the OS navigation stack 608, using the navigation stack module 602, to keep the OS navigation stack 608 consistent with the navigation stack. The method 1100 can include, wherein managing the OS navigation stack 608 to keep the OS navigation stack 608 consistent with the navigation stack 602 includes managing (using the navigation stack module 602) the OS navigation stack 608 such that at most two visual view entries are stored on the OS navigation stack 608. The method 1100 can include, wherein managing the OS navigation stack 608 includes managing (using the navigation stack module 602) the OS navigation stack 608 so that the visual views of the OS navigation stack 608 are visual views from corresponding workflow activities and the visual views are stored on the OS navigation stack 608 in the same order as the corresponding workflow activities are stored on the navigation stack 604.

The method 1100 can include popping (using the navigation stack module 602) a workflow activity onto the navigation stack 604 that was not previously performed by the application 202 in response to the application state changing. Popping the workflow activity on the navigation stack 604 that was not previously performed includes popping a logout workflow activity on the navigation stack 604.

The method 1100 can include receiving data indicating that a user is navigating to a previous workflow activity (using the primary UIs 204A-C). The operation at 1106 can include pushing the workflow activity onto the navigation stack that was not previously performed, in response receiving the data indicating that the user is navigating to the previous workflow activity.

Application Development

Figure 12:
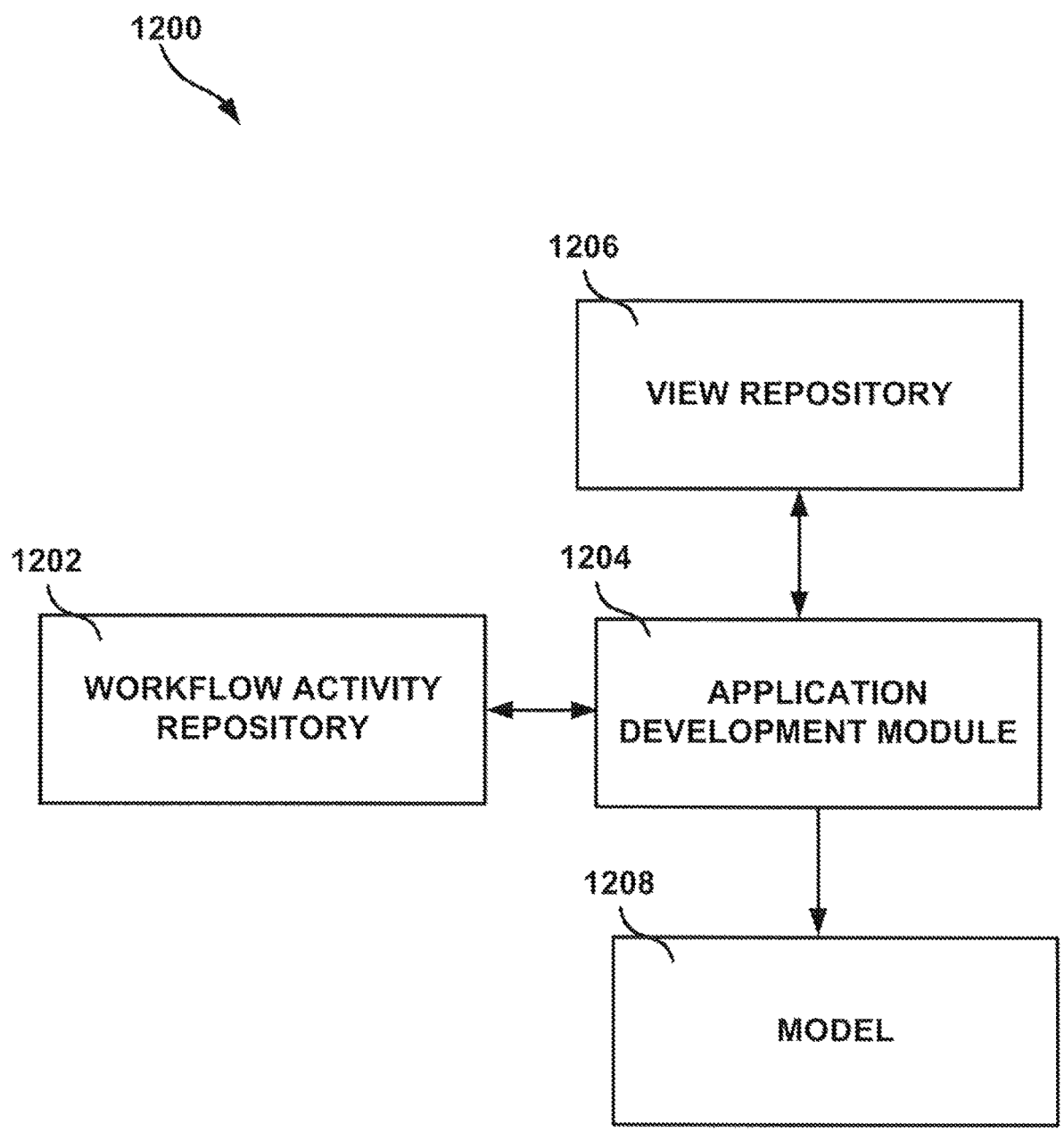
FIG. 12 illustrates, by way of example, a block diagram of an embodiment of a system for application development.

FIG. 12 illustrates, by way of example, a block diagram of an embodiment of a system 1200 for application development. The system 1200 as illustrated includes a workflow activity repository 1202, an application development module 1204, a view repository 1206, and an application model 1208.

The workflow activity repository 1202 can include an organized store of workflow activities that are available to a user in building a multi-primary UI application. The view repository 1206 can include an organized store of views that are available to be associated with a workflow. The workflow activity repository 1202 and the view repository 1206 can be stored remote or local to the application development module. The workflow activity repository 1202 and the view repository 1206 can provide an asset store of workflow activities and views that can be wired together and/or associated with one another to build workflow-based applications for any platform and with arbitrary views.

The workflow activities of the workflow activity repository may be linked to other workflow activities, allowing an application to be described by chaining together workflow activities. A new workflow activity may be created and stored on the workflow activity repository 1202, such as by an application developer using a software library description of possible aspects of the workflow activities. Each workflow activity can include logic and views for each supported platform associated therewith. A workflow activity may be used in more than one application. Linking workflow activities with transitions and views can provide an application developer a way to create an application.

The application development module 1204 can receive data indicating the selected workflow activities and views to associate with those workflow activities (as specified by a user) and produce the application model 1208 using the received data. The application model 1208 can be loaded into the model 210, such as to provide the functionality as specified by the user in developing the application model 1208. The application model 1208 can define application states so as to indicate state transitions. The state transitions can be dependent on a user interaction with a primary UI, such as a user speaking or typing a specific phrase or scanning a specified object, for example.

The application model 1208 can be bound to a primary UI at build time or run time. Using such a configuration can allow a variety of different UIs to be bound to the application. Such a configuration can cause the application model 1208 to build or run differently on different builds or runs. For example, if a first mobile device is being used as a primary UI, the application model 1208 can be built or run differently than if a different mobile device is being used as the primary UI. The different runs or builds can account for differences in the different primary UIs that can be connected to the application. In this manner, the workflow activities can be independent of the presentation layer of the application (i.e., the primary UIs), the modes of input and/or output, the platform running the primary UIs, and/or the other workflow activities. By binding the application to the presentation layer at run or build time, the different primary UIs can be used together or independently to alter an application state of the application. The application model 1208 produced by the application development module can include data defining an application including workflow activities, state transitions between workflow activities, and the associated presentation layer views. The data can be logged in a document that may or may not be editable, such as an XML or a Java Script Object Notation (JSON) document. This document can be considered an "intermediate representation." An application developer can edit the intermediate representation document to alter the application. Such a configuration can help simplify business workflow application development. The XML document data can be converted into code and compiled further simplifying the application development process.

Figure 13:
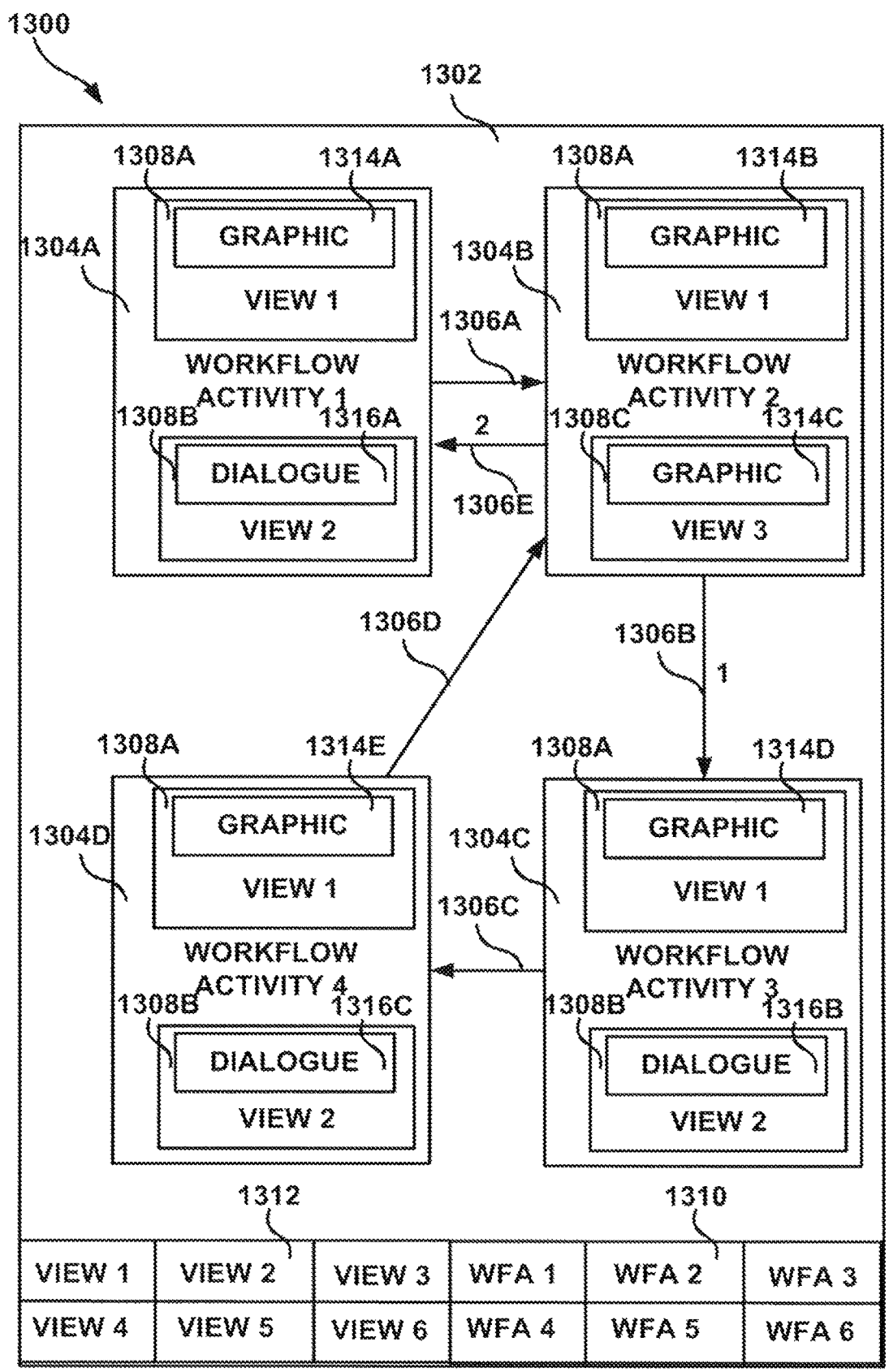
FIG. 13 illustrates, by way of example, a block diagram of an embodiment of a UI for application development.

FIG. 13 illustrates, by way of example, a block diagram of an embodiment of a UI 1300 that can be presented to a user developing a multi-primary UI application. The UI 1300 can include a workbench 1302 on which a user can organize workflow activities 1304A, 1304B, 1304C, and/or 1304D, define connections 1306A, 1306B, 1306C, 1306D, and/or 1306E between the workflow activities 1304A-D, and associate views 1308A, 1308B, and/or 1308C with the workflow activities 1304A-D. The workbench 1302 can include a list of available workflow activities 1310 and/or a list of views 1312 that can be associated with a workflow activity.

The Workflow Activities (WFAs) can be objects representing a given workflow activity, such that a user can select a WFA object from the available workflow activities 1310 and drag and drop the WFA object onto the workbench 1302. The user can then define the connections 1306A-E between workflow activities 1304A-D on the workbench 1302. The connections 1306A-E can indicate state transitions between workflow activities 1304A-D. For example, the connection 1306A indicates that the application is to transition from workflow activity 1304A to 1304B in response to some event occurring in the workflow activity 1304A, such as the workflow activity 1304A being completed. The connection 1306B indicates that the application is to transition from workflow activity 1304B to 1304C in response to the workflow activity 1304B being completed the first time. The connection 1306E indicates that the application is to transition from workflow activity 1304B to 1304A in response to the workflow activity 1304B being completed a second time.

The views in the available views 1312 can be objects representing a given view, such that a user can select a view object from the available views 1312 and drag and drop the view object onto a workflow activity 1304A-D to associate the view with the workflow activity. The views 1308A-C can include visual views, voice dialogue views, printer views, or other views that can be rendered on a primary UI. The views 1308A-C can be configurable, such that a user can define what is presented to a user when the associated workflow activity is performed. For example, if a view is a visual view, such as the view 1308A-C, the user can associate a graphic 1314A, 1314B, 1314C, 1314D, and/or 1314E (e.g., a picture, text, or a combination thereof, among others) with the view to define what is presented to a user when the corresponding workflow activity is presented. In another example, if a view is a voice dialogue view, the user can associate a dialogue 1316A, 1316B, and/or 1316C (e.g., text, a sound snippet, a recording, or a combination thereof, among others) that can be presented to the user when the corresponding workflow activity is presented. For example, when the workflow activity 1304A is presented to the user, the graphic 1314A and the dialogue 1316A can be presented to the user simultaneously. An input box can be presented to a user in response to a user selecting (e.g., touching on a touch screen, clicking using a mouse, hovering and pressing a button) the workflow activity 1304A-D, the graphic 1314A-E, or the dialogue 1316A-C. The user can then select a graphic, sound snippet, or enter text into the input that can be presented using the associated view.

The application model 1208 (e.g., the model 210) can include data defining the transitions between the workflow activities (i.e. application states). The view model module 208 can include data defining the views associated with the workflow activities defined by the user, such that if the model 1208 indicates to transition to workflow activity 1304C, the view model module 208 knows what views are associated with the workflow activity 1304C and can provide data to the view module 206A-C that causes the view module 208 to render a view on a primary UI 204A-C coupled thereto. The navigation stack module 602 can push and/or pop activities onto or off of the navigation stack 604 and/or the OS navigation stack 608 so that the stacks remain consistent with the developed application. For example, if a developer has indicated that if a user navigates to a previous screen while workflow activity 1304C is being performed then workflow activity 1304B is presented, the stack can then manage the entries on the stack(s) to include the workflow activity 1304B below the workflow activity 1304C on the stack(s).

The application model 1208 produced can include default rules that may or may not be overridden by a developer. For example, a default rule can include that when performing a workflow activity and a user navigates to a previous screen the previous workflow activity can be displayed or a logout workflow activity can be displayed. Other default rules can include the application model 1208 including a welcome, a user name, and/or a password workflow activity on startup.

Figure 14:
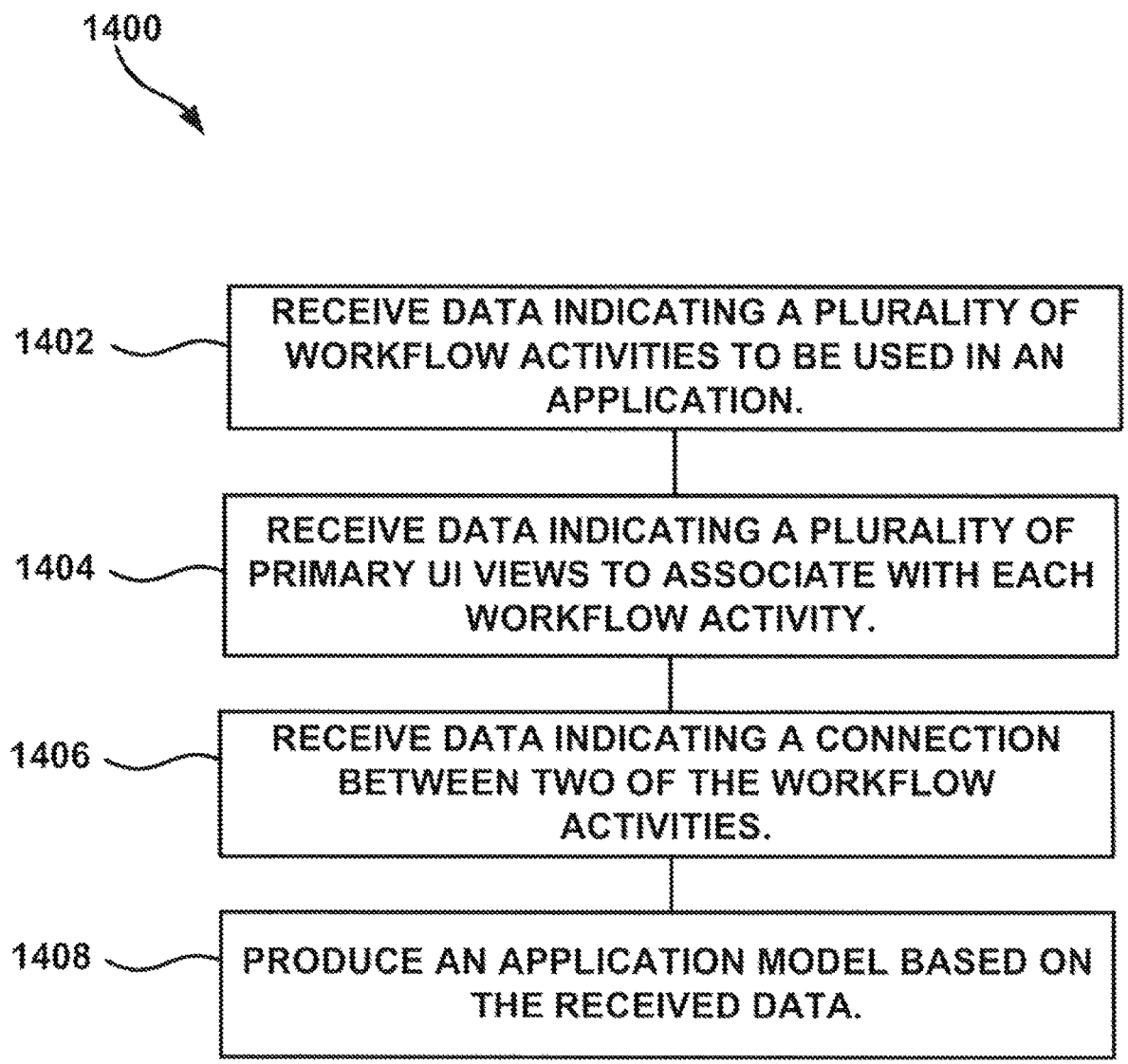
FIG. 14 illustrates, by way of example, a flow diagram of an embodiment of a method for application development.

FIG. 14 illustrates, by way of example, a flow diagram of an embodiment of a method 1400 of application development. The method 1400 as illustrated includes: receiving data indicating a plurality of workflow activities to be used in an application, at operation 1402; receiving data indicating a plurality of primary UI views to associate with each workflow activity, at operation 1404; receiving data indicating a connection between two of the workflow activities of the plurality of workflow activities, at operation 1406; and producing an application model based on the received data, at operation 1408.

The method 1400 can include presenting the plurality of workflow activities as objects that the user drags and drops onto a workbench of the application development environment and wherein the application development environment is configured to allow the user to draw the connections between objects on the workbench. The operation at 1408 can include producing an extensible markup language (XML) document description of the application model. The document description of the application model can be in another format other than XML, such as JSON. The document description of the application model can be in a machine-readable format. The method 1400 can include binding the application model to a plurality of primary UIs at run time or build time. The run or build of the application model can be different for different primary UIs.

The method 1400 can include receiving data indicating a first view to be associated with a first workflow activity of the plurality of workflow activities and receiving data indicating a second view to be associated with the first workflow activity such that the first view and the second view are presented simultaneously in response to the workflow activity being performed. The method 1400 can include receiving data indicating a dialogue to be associated with a voice dialogue view of a first workflow activity of the plurality of workflow activities and receiving data indicating a text or a graphic to be associated with a visual view of the first workflow activity such that the visual view and the voice dialogue view are presented simultaneously when performing the workflow activity. The method 1400 can include compiling the application model and/or loading the application model into an application.

As used herein, "automatically" means without human input or interference after deployment. For example, the view model module automatically providing data to the view modules that causes the view modules to render a view of a workflow activity on a primary UI means that the view model module accomplishes these tasks without human input or interference after the view model module is compiled and/or running. Any step of the methods discussed herein (e.g., the method 500, the method 1100, and/or the method 1400 can be performed automatically).

Figure 15:
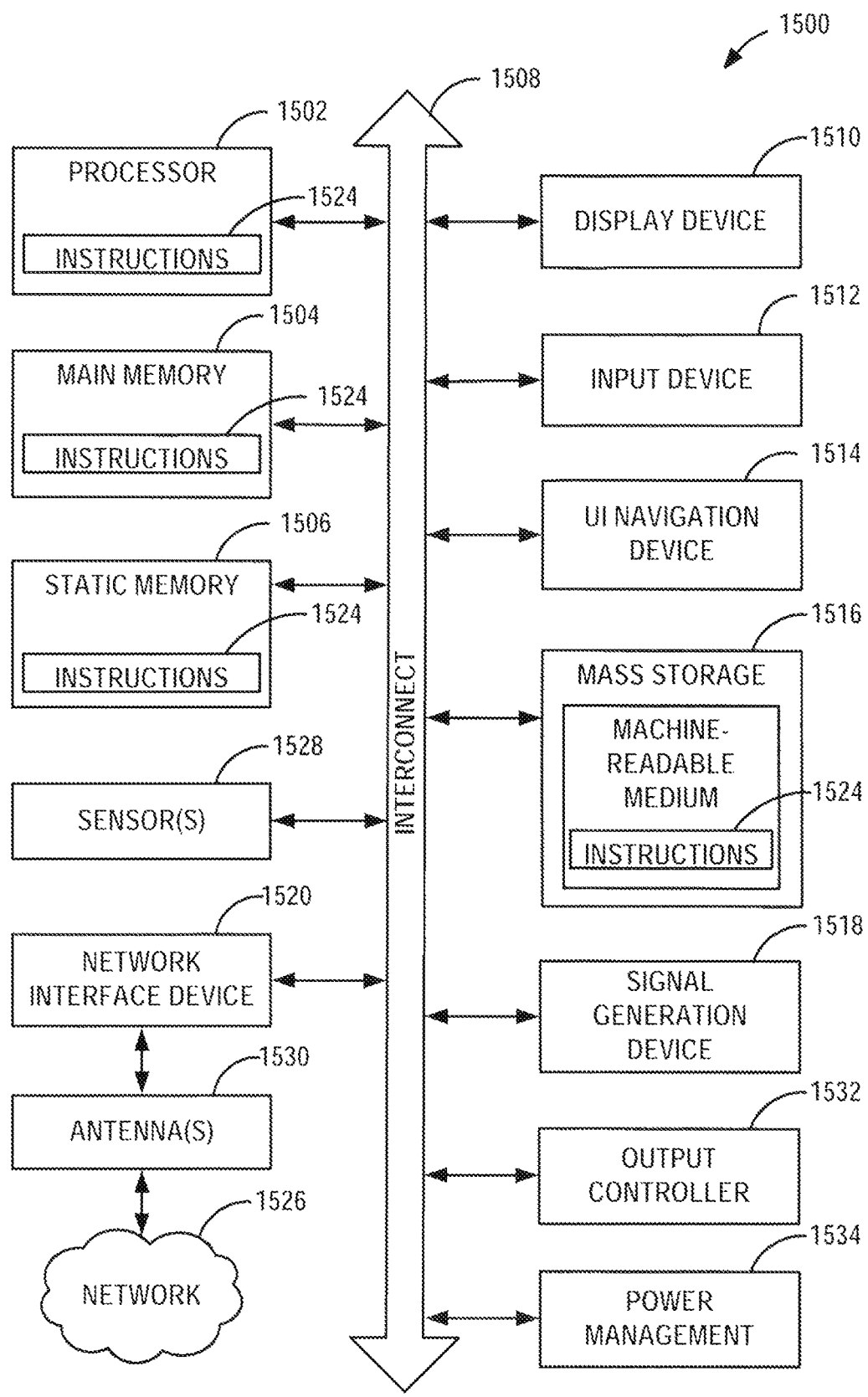
FIG. 15 illustrates, by way of example, a block diagram of an embodiment of a machine which may be used in performing one or more methodologies discussed herein.

FIG. 15 illustrates, by way of example, a block diagram of an embodiment of a machine 1500 upon which any one or more of the methods discussed herein may be performed. In one or more embodiments, the primary UIs 204A-C, the view module 206A-C, the view model module 208, the application model 210, the navigation stack module 602, the navigation stack 604, the OS 606, the OS navigation stack 608, the workflow activity repository 1202, the application development module 1204, the view repository 1206, and/or the application model 1208 can include one or more items of machine 1500. Machine 1500 can be embodied as a computing device, providing operations of the application 202, the primary UIs 204A-C, the view module 206A-C, the view model module 208, the application model 210, the navigation stack module 602, the navigation stack 604, the OS 606, the OS navigation stack 608, the workflow activity repository 1202, the application development module 1204, the view repository 1206, and/or the application model 1208, or any other processing or computing platform or component described or referred to herein.

In alternative embodiments, the machine 1500 operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The computer system machine can be a personal computer (PC), such as a PC that can be portable (e.g., a notebook or a netbook) or a PC that is not conveniently portable (e.g., a desktop PC), a tablet, a set-top box (STB), a gaming console, a Personal Digital Assistant (PDA), a mobile telephone or Smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example machine 1500 can include a processor 1502 (e.g., a central processing unit (CPU), a graphics processing unit (GPU), or both), a main memory 1504 and a static memory 1506, which communicate with each other via an interconnect 1508 (e.g., a link, a bus, etc.). The machine 1500 can further include a video display unit 1510, an alphanumeric input device 1512 (e.g., a keyboard), and a user interface (UI) navigation device 1514 (e.g., a mouse). In one embodiment, the video display unit 1510, input device 1512, and UI navigation device 1514 are a touch screen display. The machine 1500 can additionally include a storage device 1516 (e.g., a drive unit), a signal generation device 1518 (e.g., a speaker), an output controller 1532, a power management controller 1534, or a network interface device 1520 (which can include or operably communicate with one or more antennas 1530, transceivers, or other wireless communications hardware), or one or more sensors 1528, such as a GPS sensor, compass, location sensor, accelerometer, or other sensor.

The storage device 1516 includes a machine-readable medium 1522 on which is stored one or more sets of data structures and instructions 1524 (e.g., software) embodying or utilized by any one or more of the methodologies or functions described herein. The instructions 1524 can also reside, completely or at least partially, within the main memory 1504, static memory 1506, and/or within the processor 1502 during execution thereof by the machine 1500, with the main memory 1504, static memory 1506, or the processor 1502 also constituting machine-readable media. The processor 1502 configured to perform an operation can include configuring instructions of a memory or other machine-readable media coupled to the processor, which when executed by the processor, cause the processor 1502 to perform the operation.

While the machine-readable medium 1522 is illustrated in an example embodiment to be a single medium, the term "machine-readable medium" can include a single medium or multiple media (e.g., a centralized or distributed database, and/or associated caches and servers) that store the one or more instructions 1524. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding, or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 1524 can further be transmitted or received over a communications network 1526 using a transmission medium via the network interface device 1520 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes and Examples

The present subject matter can be described by way of several examples.

Example 1 can include or use subject matter (such as an apparatus, a method, a means for performing acts, or a device readable memory including instructions that, when performed by the device, can cause the device to perform acts) that can include or use a software application including a first view module, a second view module, and a view model module communicatively coupled to the first and second view modules, a first primary user interface communicatively coupled to the first view module, the first primary user interface configured by the first view module to provide a first view of an application state of the application, a second primary user interface communicatively coupled to the second view module, the second primary user interface configured by the second view module to provide a second view of the application state simultaneously with the first view of the application state, and the view model module and the first and second view modules are configured to exchange data and respond to commands issued in response to a user interacting with the first primary user interface and second primary user interface, the view model module to provide data and requests to the first and second view modules to cause the first and second view modules to render the first and second views of the application state.

Example 2 can include or use, or can optionally be combined with the subject matter of Example 1, to include or use, wherein the software application further includes a third view module and wherein Example 1 further comprises a third primary user interface communicatively coupled to the third view module, the third primary user interface configured by the third view module to provide a third view of the application state simultaneously with the first and second views of the application state, and wherein the view model module and the first, second, and third view modules are configured to exchange data and respond to the commands issued in response to the user interacting with the first, second, and third primary user interfaces, the view model module further configured to provide data and requests to the third view module to cause the third view module to render a third view of the application state.

Example 3 can include or use, or can optionally be combined with the subject matter of at least one of Examples 1-2, to include or use, wherein the first view is a visual view and the first primary user interface includes a touch screen display or a display coupled to a keyboard and wherein the second view is a voice dialogue view and the second primary user interface includes a microphone and a speaker.

Example 4 can include or use, or can optionally be combined with the subject matter of at least one of Examples 1-2, to include or use, wherein the first view is a visual view and the first primary user interface includes a barcode scanner including a display and wherein the second view is voice dialogue view and the second primary user interface includes a microphone and a speaker.

Example 5 can include or use, or can optionally be combined with the subject matter of at least one of Examples 1-2 to include or use, wherein the first view is a first visual view and the first primary user interface includes a touch screen display or a display coupled to a keyboard and wherein the second view is a second view and the second user interface includes a barcode scanner including a display.

Example 6 can include or use, or can optionally be combined with the subject matter of at least one of Examples 1-5 to include or use, wherein the view model module is configured to, in response to receiving data from the first view module, provide data to the second view module so that the data received from a user interacting on the first primary user interface is presented in the second view.

Example 7 can include or use, or can optionally be combined with the subject matter of at least one of Examples 1-6 to include or use, wherein the application operates independent of the number of primary user interfaces such that in response to the first user interface being deactivated the application state does not change and the application state changes in response to receiving data indicative of second data and a second command from the second primary user interface.

Example 8 can include or use subject matter (such as an apparatus, a method, a means for performing acts, or a device readable memory including instructions that, when performed by the device, can cause the device to perform acts) that can include or use providing, using a first view module, first data to a first primary user interface that causes the first primary user interface to provide a first view of an application state of a software application, providing, using a second view module, second data to a second primary user interface that causes the second primary user interface to provide a second view of the application state simultaneously with the first view, changing the application state to a new application state, and in response to changing the application state, providing data to the first and second view modules so as to cause the first primary user interface to provide a first view of the new application state and the second primary user interface to simultaneously provide a second view of the new application state.

Example 9 can include or use, or can optionally be combined with the subject matter of Example 8 to include or use providing, using a third view module, third data to a third primary user interface that causes the third primary user interface to provide a third view of an application state of a software application simultaneously with the first and second views, and providing, in response to changing the application state, data to the third primary user interface so as to cause the third primary user interface to provide a third view of the new application state simultaneously with the first and second views.

Example 10 can include or use, or can optionally be combined with the subject matter of at least one of Examples 8-9 to include or use, wherein the first view is a visual view and the first primary user interface includes a touch screen display or a display coupled to a keyboard and wherein the second view is a voice dialogue view and the second primary user interface includes a microphone and a speaker.

Example 11 can include or use, or can optionally be combined with the subject matter of at least one of Examples 8-9 to include or use, wherein the first view is a visual view and the first primary user interface includes a barcode scanner including a display and wherein the second view is voice dialogue view and the second primary user interface includes a microphone and a speaker.

Example 12 can include or use, or can optionally be combined with the subject matter of at least one of Examples 8-9 to include or use, wherein the first view is a first visual view and the first primary user interface includes a touch screen display or a display coupled to a keyboard and wherein the second view is a second view and the second user interface includes a barcode scanner including a display.

Example 13 can include or use, or can optionally be combined with the subject matter of at least one of Examples 8-12 to include or use receiving at the view model module, data entered using the first primary user interface and providing data to the second primary user interface so that the data received from the first primary user interface is presented in the second view.

Example 14 can include or use, or can optionally be combined with the subject matter of at least one of Examples 8-13 to include or use deactivating the first primary user interface and then, in response to receiving data indicative of second data and a second command, changing the application state.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in this document, the terms "first," "second," and "third," etc. are used merely as labels, and are not intended to impose numerical requirements on their objects.

From the foregoing, it will be observed that numerous variations and modifications can be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;

U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;

U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;

U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTOCONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);
U.S. patent application Ser. No. 14/578,627 for SAFETY SYSTEM AND METHOD filed Dec. 22, 2014 (Ackley et al.);
U.S. patent application Ser. No. 14/580,262 for MEDIA GATE FOR THERMAL TRANSFER PRINTERS filed Dec. 23, 2014 (Bowles);
U.S. patent application Ser. No. 14/590,024 for SHELVING AND PACKAGE LOCATING SYSTEMS FOR DELIVERY VEHICLES filed Jan. 6, 2015 (Payne);
U.S. patent application Ser. No. 14/596,757 for SYSTEM AND METHOD FOR DETECTING BARCODE PRINTING ERRORS filed Jan. 14, 2015 (Ackley);
U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PREPAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments and environments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A system, comprising:
a memory to store computer executable instructions; and
a processor that executes the computer-executable instructions to facilitate operation of components, comprising:
an application including a first view module, a second view module, and a view model module communicatively coupled to the first and second view modules;
a first primary user interface communicatively coupled to the first view module, the first primary user interface configured by the first view module to provide a first view of an application state of the application; and
a second primary user interface communicatively coupled to the second view module, the second primary user interface configured by the second view module to provide a second view of the application state simultaneously with the first view of the application state, wherein to provide the second view of the application state simultaneously with the first view of the application state, the second primary user interface is configured to provide a previous second view of the application state simultaneously with a previous first view of the application state in response to a user navigating backwards in the first view of the application state,
wherein the view model module and the first and second view modules are configured to exchange data and respond to commands issued in response to the user interacting with the first primary user interface and the second primary user interface,
wherein the view model module is configured to provide data and requests to the first and second view modules to cause the first and second view modules to render the first and second views of the application state, and
wherein the application state is decoupled from the first and second primary user interfaces, such that in response to a change in the application state to a new application state, one of the first view and the second view of the application state persists to provide one of a first view and a second view of the new application state, and wherein one of the first view and the second view of the new application state comprises a highlighted item to indicate the change in the application state and a task to be performed by the user, and
in response to determining that the user has skipped the task corresponding to the highlighted item, the view model module is configured to disable other one of the first view or the second view.

2. The system of claim 1, wherein in response to the change in the application state, both the first view and the second view of the application state are disabled, wherein the application includes a third view module, and wherein the system further comprises:
a third primary user interface communicatively coupled to the third view module, the third primary user interface configured by the third view module to provide a third view of the application state when both the first view and the second view of the application state are disabled,
wherein the view model module and the first, second, and third view modules are configured to exchange data and respond to the commands issued in response to the user interacting with the first, second, and third primary user interfaces, the view model module further configured to provide data and requests to the third view module to cause the third view module to render a third view of the application state.

3. The system of claim 1, wherein the first view is a visual view, the first primary user interface includes a touch screen display or a display coupled to a keyboard, the second view is a voice dialogue view, and the second primary user interface includes a microphone and a speaker.

4. The system of claim 1, wherein the first view is a visual view, the first primary user interface includes a barcode scanner including a display, the second view is a voice dialogue view, and the second primary user interface includes a microphone and a speaker.

5. The system of claim 1, wherein the first view is a first visual view, the first primary user interface includes a touch screen display or a display coupled to a keyboard, the second view is a second visual view, and the second user interface includes a barcode scanner including a display.

6. The system of claim 1, wherein the view model module is configured to, in response to receiving data from the first view module, provide data to the second view module so that the data received from the user interacting on the first primary user interface is presented in the second view.

7. A method comprising:
providing, by a processor executing one or more computer-executable instructions stored in memory, using a first view module, first data to a first primary user interface that causes the first primary user interface to provide a first view of an application state of an application;
providing, by the processor, using a second view module, second data to a second primary user interface that causes the second primary user interface to provide a second view of the application state simultaneously with the first view, wherein providing the second view of the application state simultaneously with the first view of the application state comprises providing a previous second view of the application state simultaneously with a previous first view of the application state in response to a user navigating backwards in the first view of the application state;
changing, by the processor, the application state to a new application state, wherein the application state is decoupled from the first and second primary user interfaces, such that in response to changing the application state, one of the first view and the second view of the application state persists to provide one of a first view and a second view of the new application state, and wherein one of the first view and the second view of the new application state comprises a highlighted item to indicate the change in the application state and a task to be performed by the user, and in response to determining that the user has skipped the task corresponding to the highlighted item, the view model module is configured to disable other one of the first view or the second view; and
providing, by the processor, in response to changing the application state, data to one of the first and second view modules based on which of the first view and the second view of the application state persists.

8. The method of claim 7, wherein in response to changing the application state to the new application state, both the first view and the second view of the application state are disabled, the method further comprising:
providing, by the processor, data to a third primary user interface so as to cause the third primary user interface to provide a third view of the new application state.

9. The method of claim 7, wherein the first view is a visual view and the first primary user interface includes a touch screen display or a display coupled to a keyboard, and wherein the second view is a voice dialogue view and the second primary user interface includes a microphone and a speaker.

10. The method of claim 7, wherein the first view is a visual view and the first primary user interface includes a barcode scanner including a display, and wherein the second view is a voice dialogue view and the second primary user interface includes a microphone and a speaker.

11. The method of claim 7, wherein the first view is a first visual view and the first primary user interface includes a touch screen display or a display coupled to a keyboard, and wherein the second view is a second visual view and the second user interface includes a barcode scanner including a display.

12. The method of claim 7, further comprising:
receiving, by the processor, at a view model module, data entered using the first primary user interface; and
providing the data to the second primary user interface so that the data received from the first primary user interface is presented in the second view.

13. A non-transitory machine readable storage device comprising instructions stored thereon that, when executed by a machine, configure the machine to perform operations comprising:
providing first data to a first primary user interface that causes the first primary user interface to provide a first view of an application state of an application;
providing second data to a second primary user interface that causes the second primary user interface to provide a second view of an application state of a software application simultaneously with the first view, wherein providing the second view of the application state simultaneously with the first view of the application state comprises providing a previous second view of the application state simultaneously with a previous first view of the application state in response to a user navigating backwards in the first view of the application state;
changing the application state to a new application state, wherein the application state is decoupled from the first and second primary user interfaces, such that in response to changing the application state, one of the first view and the second view of the application state persists to provide one of a first view and a second view of the new application state, and wherein one of the first view and the second view of the new application state comprises a highlighted item to indicate the change in the application state and a task to be performed by the user, and in response to determining that the user has skipped the task corresponding to the highlighted item, the view model module is configured to disable other one of the first view or the second view; and providing, in response to changing the application state, data to one of the first and second primary user interfaces based on which of the first view and the second view of the application state persists.

14. The non-transitory machine readable storage device of claim 13, wherein in response to changing the application state to the new application state, both the first view and the second view of the application state are disabled, the storage device further comprising instructions which, when executed by the machine, configure the machine to perform operations comprising:

providing data to a third primary user interface so as to cause the third primary user interface to provide a third view of the new application state.

15. The storage device of claim 13, wherein the first view is a visual view and the first primary user interface includes a touch screen display or a display coupled to a keyboard, and wherein the second view is a voice dialogue view and the second primary user interface includes a microphone and a speaker.

16. The storage device of claim 13, wherein the first view is a visual view and the first primary user interface includes a barcode scanner including a display, and wherein the second view is a voice dialogue view and the second primary user interface includes a microphone and a speaker.

17. The storage device of claim 13, further comprising instructions which, when executed by the machine, configure the machine to perform operations comprising receiving data entered using the first primary user interface and providing the data to the second primary user interface so that the data received from the first primary user interface is presented in the second view.

18. The storage device of claim 13, further comprising instructions which, when executed by the machine, configure the machine to perform operations comprising:

receiving data indicating the first primary user interface is deactivated;

receiving data indicative of third data and a third command from the second primary user interface;

changing, in response to receiving the third data, the application state to another application state; and providing data to the second primary user interface that causes the second primary user interface to provide a view of the another application state.

* * * * *